US011881659B2

(12) United States Patent
Wiegman

(10) Patent No.: US 11,881,659 B2
(45) Date of Patent: Jan. 23, 2024

(54) CONNECTOR AND METHODS OF USE FOR CHARGING AN ELECTRIC VEHICLE

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

(*) Notice: Subject to any disclaimer, the term of this patent is extended or adjusted under 35 U.S.C. 154(b) by 33 days.

(21) Appl. No.: 17/407,330

(22) Filed: Aug. 20, 2021

(65) Prior Publication Data

US 2023/0060928 A1 Mar. 2, 2023

(51) Int. Cl.
| H01R 13/66 | (2006.01) |
| H01R 13/62 | (2006.01) |
| H01M 10/44 | (2006.01) |
| H02J 7/00 | (2006.01) |
| B60L 53/16 | (2019.01) |
| B64D 27/24 | (2006.01) |
| B60L 53/62 | (2019.01) |
| B64F 1/36 | (2017.01) |
| B60L 53/30 | (2019.01) |

(52) U.S. Cl.
CPC .......... H01R 13/6666 (2013.01); B60L 53/16 (2019.02); B60L 53/305 (2019.02); B60L 53/62 (2019.02); B64D 27/24 (2013.01); B64F 1/362 (2013.01); H01M 10/44 (2013.01); H01R 13/62 (2013.01); H02J 7/0045 (2013.01); B60L 2200/10 (2013.01); H01M 2220/20 (2013.01); H01R 2201/10 (2013.01); H01R 2201/26 (2013.01)

(58) Field of Classification Search
CPC ................ H01R 13/6666; H01R 13/62; H01R 2201/10; H01R 2201/26; B60L 53/16; B60L 53/62; B60L 53/305; B60L 2200/10; B64D 27/24; B64F 1/362; H01M 2220/20; H01M 10/44; H02J 7/0045; H02J 7/007188–007194
See application file for complete search history.

(56) References Cited

U.S. PATENT DOCUMENTS 8,035,247 B2   10/2011   Ichikawa
9,197,085 B2   11/2015   Yamaguchi et al.
(Continued)

FOREIGN PATENT DOCUMENTS

WO   WO-2017078253 A1 *   5/2017   ........ H01M 10/0585

OTHER PUBLICATIONS

WO-2017078253-A1 Machine Translation. (Year: 2022).*

*Primary Examiner* — David V Henze-Gongola
(74) *Attorney, Agent, or Firm* — Hoffman Warnick LLC

(57) ABSTRACT

In an aspect a connector for charging an electric vehicle. A connector includes a coupling mechanism. A coupling mechanism is configured to mate with an electric vehicle port of an electric vehicle. A coupling mechanism includes a fastener for removable attachment with an electric vehicle port. A connector includes at least a direct current conductor. At least a direct current conductor is configured to supply a direct current to an electric vehicle. A connector includes a power supply circuit. A power supply circuit is configured to regulate a direct current supplied to an electric vehicle as a function of a power threshold.

20 Claims, 12 Drawing Sheets

(56) References Cited

U.S. PATENT DOCUMENTS

| | | |
|---|---|---|
| 9,592,744 B2 | 3/2017 | Zhao |
| 10,364,025 B2 | 7/2019 | Krishnamoorthy et al. |
| 10,446,883 B2 | 10/2019 | Spigno et al. |
| 10,673,263 B2 | 6/2020 | Nakao |
| 10,864,995 B2 | 12/2020 | Chang et al. |
| 10,913,372 B2 | 2/2021 | Baxter et al. |
| 2009/0102433 A1* | 4/2009 | Kamaga .................. B60L 53/22 320/165 |
| 2011/0276194 A1* | 11/2011 | Emalfarb ................ H02J 3/322 700/297 |
| 2017/0214256 A1 | 7/2017 | Hardy |
| 2019/0263281 A1* | 8/2019 | Wang .................... B60L 53/305 |
| 2019/0305367 A1 | 10/2019 | Miyajima |
| 2019/0348721 A1 | 11/2019 | Unno |
| 2019/0372356 A1 | 12/2019 | Tiainen |
| 2020/0254882 A1* | 8/2020 | Kwon ..................... B60L 53/16 |
| 2021/0237607 A1* | 8/2021 | Chen ......................... B60L 3/00 |

\* cited by examiner

CONNECTOR AND METHODS OF USE FOR CHARGING AN ELECTRIC VEHICLE

FIELD OF THE INVENTION

The present invention generally relates to the field of electric vehicles. In particular, the present invention is directed to a connector and methods of use for charging an electric vehicle.

BACKGROUND

Electric vehicles hold great promise in their ability to run using sustainably source energy, without increase atmospheric carbon associated with burning of fossil fuels. Perennial downsides associated with electric vehicles, include poor energy storage and therefore range of operation, as well as long times to recharge on board batteries.

SUMMARY OF THE DISCLOSURE

In an aspect a connector for charging an electric vehicle. A connector includes a coupling mechanism. A coupling mechanism is configured to mate with an electric vehicle port of an electric vehicle. A coupling mechanism includes a fastener for removable attachment with an electric vehicle port. A connector includes at least a direct current conductor. At least a direct current conductor is configured to supply a direct current to an electric vehicle. A connector includes a power supply circuit. A power supply circuit is configured to regulate a direct current supplied to an electric vehicle as a function of a power threshold.

In another aspect a method of charging an electric vehicle. A method includes providing a connector. A connector includes a coupling mechanism. A coupling mechanism is configured to mate with an electric vehicle port of an electric vehicle. A coupling mechanism includes a fastener for removable attachment with an electric vehicle port. A connector includes at least a direct current conductor. At least a direct current conductor is configured to supply a direct current to an electric vehicle. A connector includes a power supply circuit. A power supply circuit is configured to regulate a direct current supplied to an electric vehicle as a function of a power threshold. A method includes connecting an electric vehicle to a connector via a coupling mechanism. A method includes communicating to an electric vehicle via a connector a plurality of charging data. A method includes charging an electric vehicle via a connector. A method includes monitoring a charging of an electric vehicle via the connector.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
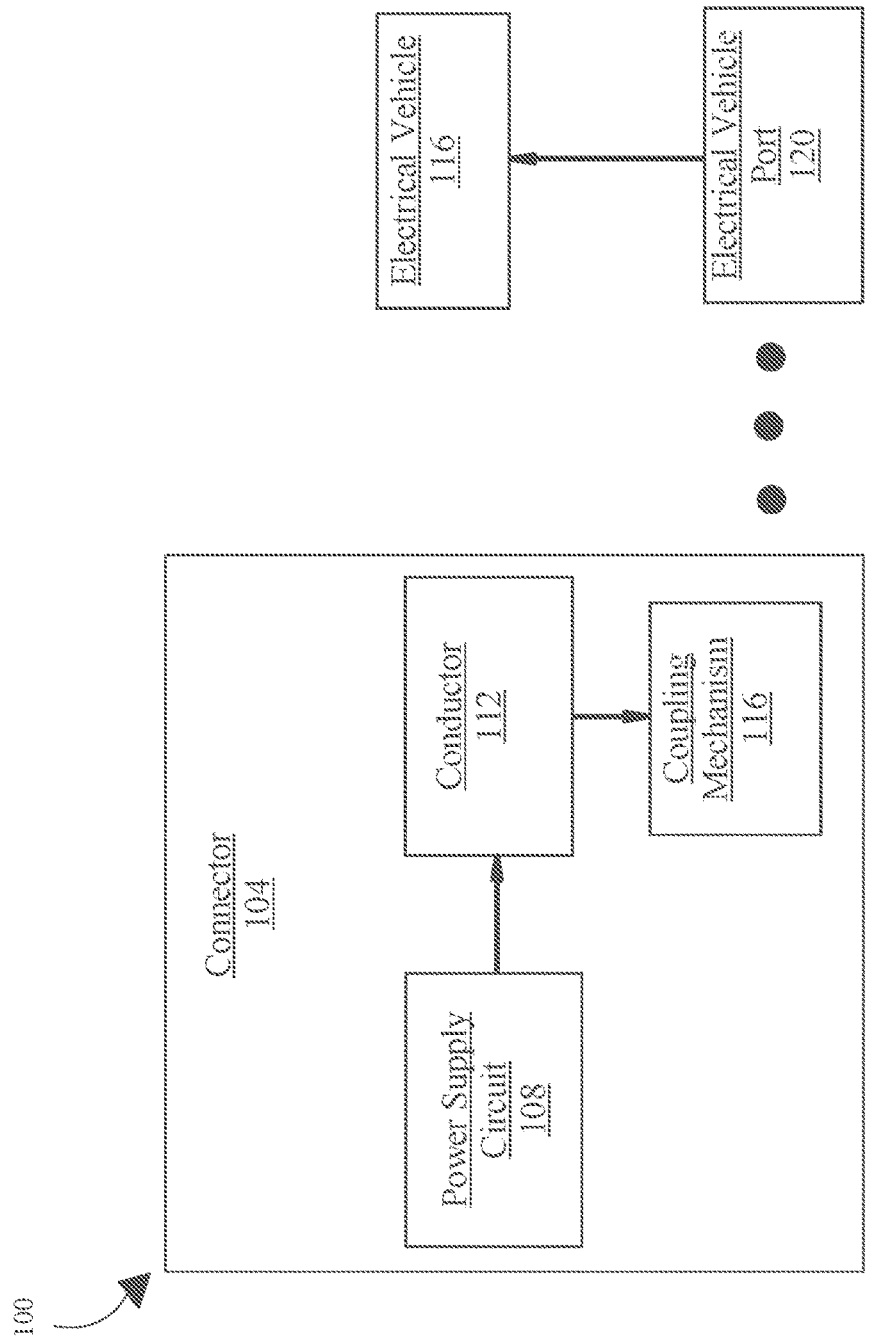
FIG. 1 is a block diagram illustrating an exemplary system for charging an electric vehicle.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure include a connector for charging an electric vehicle. In some embodiments, an electric vehicle may include an electric aircraft. In some embodiments, a connector may include a coupling mechanism. In some embodiments, a coupling mechanism may include a locking function. A coupling mechanism may be configured to mate with an electric vehicle port of an electric vehicle. A coupling mechanism may include a fastener for removable attachment with an electric vehicle port. A connector may include at least a direct current conductor. At least a direct current conductor may be configured to supply a direct current to an electric vehicle. In some embodiments, a connector may include an alternating current conductor. In some embodiments, a connector may include a ground conductor. A connector may include a power supply circuit. A power supply circuit may be configured to regulate a direct current supplied to an electric vehicle as a function of a power threshold. In some embodiments, a connector may include a communication controller. A communication controller may be coupled to a power supply circuit. A connector may be configured to charge an electric vehicle as a function of a communication controller. A communication controller may be configured to terminate a direct current supply to an electric vehicle as a function of a failed charge event. A failed charge event may include a power overload of a power supply circuit. In some embodiments, a communication controller may be configured to terminate a communication with an electric vehicle as a function of a failed charge event. In some embodiments, a power supply circuit may be configured to receive a power threshold from an electric vehicle.

At a high level, aspects of the present disclosure include a method of charging an electric vehicle. An electric vehicle may include an electric aircraft. A method may include providing a connector. A connector may include a coupling mechanism. A coupling mechanism may include a locking function. A coupling mechanism may be configured to mate with an electric vehicle port of an electric vehicle. A coupling mechanism may include a fastener for removable attachment with an electric vehicle port. A connector may include at least a direct current conductor. At least a direct current conductor may be configured to supply a direct current to an electric vehicle. A connector may include an alternating current conductor. A connector may include a ground conductor. A connector may include a power supply circuit. A power supply circuit may be configured to regulate a direct current supplied to an electric vehicle. A power supply circuit may be configured to regulate a direct current supplied to an electric vehicle as a function of a power threshold. In some embodiments, a power supply circuit may be configured to receive a power threshold from an electric vehicle. In some embodiments, a connector may include a communication controller. A communication controller may be configured to be coupled to a power supply circuit. In some embodiments, a connector may be configured to charge an electric vehicle as a function of a communication controller. In some embodiments, a communication controller may be configured to terminate a direct current supply to an electric vehicle as a function of a failed charge event. A failed charge event may include a power overload of a power supply circuit. In some embodiments, a communication controller may be configured to terminate a communication with an electric vehicle as a function of a failed charge event. A method may include connecting an electric vehicle to a connector via a coupling mechanism. A method may include communicating to an electric vehicle via a connector a plurality of charging data. A method may include charging an electric vehicle via a connector. A method may include monitoring a charging of an electric vehicle via the connector.

Aspects of the present disclosure can be used to connect with communication, control, and/or sensor signals associated with an electric vehicle during recharging, thereby allowing for monitoring of the recharge and feedback control of various recharging systems, for example power sources. Aspects of the present disclosure can also be used to verify functionality of electric vehicle recharging systems. This is so, at least in part, because certain electric vehicles, such as electric aircraft require highest assurance of technical processes associated with their maintenance. Therefore, in some cases, aspects relate to systems for verifying performance of cooling and/or charging processes in between charges of electric vehicles.

Referring now to FIG. 1, an exemplary system 100 for recharging an electric vehicle is illustrated. System 100 may be used in support of an electric aircraft. For instance, system 100 may be used to recharge an electrical aircraft. In some cases, system 100 may be tethered to electric vehicle during support. In some cases, system 100 may be tethered to a physical location on ground, for example an electrical power source. Alternatively, system 100 may not be tethered to a physical location on the ground and may be substantially free to move when not tethered to an electric vehicle. System 100 may be configured to charge and/or recharge an electric vehicle. As used in this disclosure, "charging" refers to a process of increasing energy stored within and energy source. In some cases, an energy source includes at least a battery and charging includes providing an electrical current to the at least a battery.

With continued reference to FIG. 1, system 100 may include a connector 104. Connector 104 may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. Connector 104 may include a single computing device operating independently, or may include two or more computing device operating in concert, in parallel, sequentially or the like; two or more computing devices may be included together in a single computing device or in two or more computing devices. Connector 104 may interface or communicate with one or more additional devices as described below in further detail via a network interface device. Network interface device may be utilized for connecting connector 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Connector 104 may include but is not limited to, for example, a computing device or cluster of computing devices in a first location and a second computing device or cluster of computing devices in a second location. Connector 104 may include one or more computing devices dedicated to data storage, security, distribution of traffic for load balancing, and the like. Connector 104 may distribute one or more computing tasks as described below across a plurality of computing devices of computing device, which may operate in parallel, in series, redundantly, or in any other manner used for distribution of tasks or memory between computing devices. Connector 104 may be implemented using a "shared nothing" architecture in which data is cached at the worker, in an embodiment, this may enable scalability of system 100 and/or computing device.

With continued reference to FIG. 1, connector 104 may be designed and/or configured to perform any method, method step, or sequence of method steps in any embodiment described in this disclosure, in any order and with any degree of repetition. For instance, connector 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Connector 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include a connector 104. As used in this disclosure, a "connector" is a distal end of a tether or a bundle of tethers, e.g., hose, tubing, cables, wires, and the like, which is configured to removably attach with a mating component, for example without limitation a port. As used in this disclosure, a "port" is an interface for example of an interface configured to receive another component or an interface configured to transmit and/or receive signal on a computing device. For example in the case of an electric vehicle port, the port interfaces with a number of conductors by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 1, connector 104 may include a coupling mechanism 116. A "coupling mechanism" as used in this disclosure is any component configured to attach two or more objects together. Coupling mechanism 116 may be configured to mate with a port, for example electrical vehicle port 120. As used in this disclosure, "mate" is an action of attaching two or more components together. As used in this disclosure, an "electric vehicle port" is a port located on an electric vehicle 124. As used in this disclosure, an "electric vehicle" is any electrically power means of human transport, for example without limitation an electric aircraft or electric vertical take-off and landing aircraft. In some cases, an electric vehicle will include an energy source configured to power at least a motor configured to move the electric vehicle 124.

With continued reference to FIG. 1, coupling mechanism 116 may include a fastener. As used in this disclosure, a "fastener" is a physical component that is designed and/or configured to attach or fasten two (or more) components together. Coupling mechanism 116 may include one or more attachment components or systems, for example without limitation fasteners, threads, snaps, canted coil springs, and the like. In some cases, coupling mechanism 116 may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minn. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, coupling mechanism 116 may be connected to electrical vehicle port 120 by way of magnetic force. For example, coupling mechanism 116 may include one or more of a magnetic, a ferro-magnetic material, and/or an electromagnet. Fastener may be configured to provide removable attachment between coupling mechanism 116 and at least a port, for example electrical vehicle port 112. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 1, system 100 may include one or more conductors 112 having a distal end approximately located within connector 104. As used in this disclosure, a "conductor" is a component that facilitates conduction. As used in this disclosure, "conduction" is a process by which one or more of heat and/or electricity is transmitted through a substance, for example when there is a difference of effort (i.e., temperature or electrical potential) between adjoining regions. In some cases, a conductor 112 may be configured to charge and/or recharge an electric vehicle 124. For instance, conductor 112 may be connected to a power supply circuit 108. In some embodiments, conductor 112 may be designed and/or configured to facilitate a specified amount of electrical power, current, or current type. For example, conductor 112 may include a direct current conductor. As used in this disclosure, a "direct current conductor" is a conductor configured to carry a direct current for recharging an energy source. As used in this disclosure, "direct current" is one-directional flow of electric charge. In some cases, a conductor 112 may include an alternating current conductor. As used in this disclosure, an "alternating current conductor" is a conductor configured to carry an alternating current for recharging an energy source. As used in this disclosure, an "alternating current" is a flow of electric charge that periodically reverse direction; in some cases, an alternating current may change its magnitude continuously with in time (e.g., sine wave).

With continued reference to FIG. 1, system 100 may include a power supply circuit 108. Power supply circuit 108 may be configured to provide an electrical charging current. As used in this disclosure, a "power supply circuit" is a plurality of electrical components configured to convert electric current from a power source to specific voltage, current, and frequency usable by a load. In a non-limiting example, power supply circuit 108 may be configured to output a voltage, current, and/or power frequency for charging a battery. In some cases, power supply circuit 108 may include power source. A power source may include a charging battery (i.e., a battery used for charging other batteries. A charging battery is notably contrasted with an electric vehicle battery, which is located for example upon an electric aircraft. As used in this disclosure, an "electrical charging current" is a flow of electrical charge that facilitates an increase in stored electrical energy of an energy storage, such as without limitation a battery. A charging battery may include a plurality of batteries, battery modules, and/or battery cells. A charging battery may be configured to store a range of electrical energy, for example a range of between about 5 KWh and about 5,000 KWh. A power source of power supply circuit 108 may include a variety of electrical components. In one embodiment, a power source may contain a solar inverter. A solar inverter may be configured to produce on-site power generation. In one embodiment, power generated from a solar inverter may be stored in a charging battery. In some embodiments, a charging battery may include a used electric vehicle battery no longer fit for service in a vehicle. A charging battery may include any battery described in this disclosure.

With continued reference to FIG. 1, system 100 may include conductor 112. In some embodiments, conductor 112 may be in electric communication with power supply circuit 108. As used in this disclosure, a "conductor" is a physical device and/or object that facilitates conduction, for example electrical conduction and/or thermal conduction. In some cases, a conductor may be an electrical conductor, for example a wire and/or cable. Exemplary conductor materials include metals, such as without limitation copper, nickel, steel, and the like. As used in this disclosure, "communication" is an attribute wherein two or more relata interact with one another, for example within a specific domain or in a certain manner. In some cases communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

In some embodiments, and still referring to FIG. 1, power supply circuit 108 may have a continuous power rating of at least 350 kVA. In other embodiments, power supply circuit 108 may have a continuous power rating of over 350 kVA. In some embodiments, power supply circuit 108 may have a battery charge range up to 950 Vdc. In other embodiments, power supply circuit 108 may have a battery charge range of over 950 Vdc. In some embodiments, power supply circuit 108 may have a continuous charge current of at least 350 amps. In other embodiments, power supply circuit 108 may have a continuous charge current of over 350 amps. In some embodiments, power supply circuit 108 may have a boost charge current of at least 500 amps. In other embodiments, power supply circuit 108 may have a boost charge current of over 500 amps. In some embodiments, power supply circuit 108 may include any component with the capability of recharging an energy source of an electric vehicle. In some embodiments, power supply circuit 108 may include a constant voltage charger, a constant current charger, a taper current charger, a pulsed current charger, a negative pulse charger, an IUI charger, a trickle charger, and a float charger.

Still referring to FIG. 1, in some embodiments, system 100 may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric vehicle and conductors may provide an alternating current to the electric vehicle by way of conductor 112 and connector 104. Alternatively and/or additionally, in some cases, AC-DC converter may be located outside of electric vehicle and an electrical charging current may be provided by way of a direct current to the electric vehicle. In some cases, AC-DC converter may be used to recharge a charging battery. In some cases, AC-DC converter may be used to provide electrical power to power supply circuit 108 and/or connector 104. In some embodiments, power supply circuit 108 may include an AC-DC converter. In some embodiments, power supply circuit 108 may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, power supply circuit 108 may provide power to the grid power component. In this configuration, power supply circuit 108 may provide power to a surrounding electrical power grid.

With continued reference to FIG. 1, a conductor 112 may include a control signal conductor configured to conduct a control signal. As used in this disclosure, a "control signal conductor" is a conductor configured to carry a control signal between an electric vehicle and a charger. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric vehicle (e.g., within an electric vehicle battery) and/or located within connector 112. For example, in some cases, control signal may be associated with a battery within an electric vehicle. For example, control signal may include a battery sensor signal. As used in this disclosure, a "battery sensor signal" is a signal representative of a characteristic of a battery. In some cases, battery sensor signal may be representative of a characteristic of an electric vehicle battery, for example as electric vehicle battery is being recharged. In some embodiments, connector 108 may additionally include a sensor interface configured to receive a battery sensor signal. Sensor interface may include one or more ports, an analog to digital converter, and the like. Connector 108 may be further configured to control an electrical charging current as a function of a battery sensor signal and/or control signal. For example, connector 104 may control power supply circuit 108 as a function of battery sensor signal and/or control signal. In some cases, a battery sensor signal may be representative of battery temperature. In some cases, battery sensor signal may represent a battery cell swell. In some cases, a battery sensor signal may be representative of temperature of electric vehicle battery, for example temperature of one or more battery cells within an electric vehicle battery. In some cases, a sensor, a circuit, and/or a connector 104 may perform one or more signal processing steps on a signal. For instance, sensor, circuit or connector 104 may analyze, modify, and/or synthesize a signal in order to improve the signal, for instance by improving transmission, storage efficiency, or signal to noise ratio.

Still referring to FIG. 1, exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, a conductor 112 may include a ground conductor. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration.

With continued reference to FIG. 1, connector 104 may be configured to include a controller. A controller may be configured to control one or more electrical charging current within conductor 112. As used in this disclosure, a "controller" is a logic circuit, such as an application-specific integrated circuit (ASIC), FPGA, microcontroller, and/or computing device that is configured to control a subsystem. For example, a controller may be configured to control power supply circuit 108. In some embodiments a controller may control power supply circuit 108 according to a control signal. As used in this disclosure, "control signal" is any transmission from controller to a subsystem that may affect performance of subsystem. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal may include commands to operate power supply circuit 108. In some cases, power supply circuit 108 may include one or electrical components configured to control flow of an electric recharging current or switches, relays, direct current to direct current (DC-DC) converters, and the like. In some case, power supply circuit 108 may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within power supply circuit 108 or within communication with power supply circuit 108 may be configured to affect electrical recharging current according to control signal from a controller of connector 104, such that the controller may control at least a parameter of the electrical charging current. For example, in some cases, a controller may control one or more of current (Amps), potential (Volts), and/or power (Watts) of electrical charging current by way of control signal. In some cases, a controller may be configured to selectively engage electrical charging current, for example ON or OFF by way of control signal.

With continued reference to FIG. 1, coupling mechanism 116 may be configured such that conductor 112 makes a connection with a mating component on or within an electric vehicle port 120 when connector coupling mechanism 116 is mated with electric vehicle port 112. As used in this disclosure, a "mating component" is a component that is configured to mate with at least another component, for example in a certain (i.e., mated) configuration.

With continued reference to FIG. 1, a conductor 112 may include a proximity signal conductor. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric vehicle port and/or test port. In some cases, a proximity signal may include an analog signal, a digital signal, an electrical signal, an optical signal, a fluidic signal, or the like. In some cases, a proximity signal conductor may be configured to conduct a proximity signal indicative of attachment between connector 104 and a port, for example electric vehicle port 120.

Still referring to FIG. 1, in some cases, system 100 may additionally include a proximity sensor. Proximity sensor may be electrically communicative with a proximity signal conductor. Proximity sensor may be configured to generate a proximity signal as a function of connection between connector 104 and a port, for example electric vehicle port 120. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

Still referring to FIG. 1, in some embodiments, system 100 may additionally include an isolation monitor conductor configured to conduct an isolation monitoring signal. In some cases, power systems for example power supply circuit 108 and/or electric vehicle batteries must remain electrically isolated from communication, control, and/or sensor signals. As used in this disclosure, "isolation" is a state where substantially no communication of a certain type is possible between to components, for example electrical isolation refers to elements which are not in electrical communication. Often signal carrying conductors and components (e.g., sensors) may need to be in relatively close proximity with power systems and/or power carrying conductors. For instance, battery sensors which sense characteristics of batteries, for example batteries within an electric vehicle, are often by virtue of their function placed in close proximity with a battery. A battery sensor that measures battery charge and communicates a signal associated with battery charge back to connector 104 is at risk of becoming unisolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power (e.g., a battery and/or a power source) may be required for a housing of connector 104 and a ground. Isolation monitoring signal may, in some cases, communication information about isolation between an electrical power and a ground, for example along a flow path that includes connector 104.

Still referring to FIG. 1, in some embodiments, one or more of at least a direct current conductor and at least an alternating current conductor may be further configured to conduct a communication signal and/or control signal by way of power line communication. In some cases, connector 104 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a power conductor 112. Different types of power-line communications use different frequency bands. In some case, alternating current may have a frequency of about 50 or about 60 Hz. In some cases, power conductor 112 may be shielded in order to prevent emissions of power line communication modulation frequencies. Alternatively or additionally, power line communication modulation frequency may be within a range unregulated by radio regulators, for example below about 500 KHz.

Still referring to FIG. 1, in some embodiments, a housing of connector 104 may be configured to mate with a test port. For example, a test port may be identical to electric vehicle port 120. As used in this disclosure, a "test port" is port located outside of an electric vehicle that mates with connector. In some cases, a test port may close a circuit with one or more conductors within connector 104 and thereby allow for said one more conductors to be tested, for example for continuity, impedance, resistance, and the like. In some cases, a test port may be configured to test functionality of one or more of at least a direct current conductor, at least an alternating current conductor, at least a control signal conductor, at least a ground conductor, and at least a proximity conductor. A test port may facilitate one or more signals, for example feedback signals, to be communicated with connector 104 as a function of coupling mechanism 116 being attached with the test port. In some cases, a test port may allow for verification that performance of system 100 is within specified limits.

With continued reference to FIG. 1, as used in this disclosure, "verification" is a process of ensuring that which is being "verified" complies with certain constraints, for example without limitation system requirements, regulations, and the like. In some cases, verification may include comparing a product, such as without limitation charging performance metrics, against one or more acceptance criteria. For example, in some cases, charging performance metrics, may be required to function according to prescribed constraints or specification. Ensuring that charging performance metrics are in compliance with acceptance criteria may, in some cases, constitute verification. In some cases, verification may include ensuring that data (e.g., performance metric data) is complete, for example that all required data types, are present, readable, uncorrupted, and/or otherwise useful for connector 104. In some cases, some or all verification processes may be performed by connector 104. In some cases, at least a machine-learning process, for example a machine-learning model, may be used to verify. Connector 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

Still referring to FIG. 1, in some embodiments, coupling mechanism 116 may be configured to include a locking function. A "locking function" as used in this disclosure is a system of electromechanical components that ensure a secure coupling between two or more objects. In some embodiments, a locking function may include an electric motor. An electric motor may include a servomotor. In some embodiments, a locking function may include a plurality of electric motors. In some embodiments, a locking function may include mechanical locks, such as but not limited to, latches, hatches, hooks, pins, and the like. Connector 104 may send a command to coupling mechanism 116 to lock coupling mechanism 116 to vehicle port 120. In some embodiments, connector 104 may send a command to coupling mechanism 116 to unlock coupling mechanism 116 from electrical vehicle port 120. In some embodiments, connector 104 may be configured to send a command to coupling mechanism 116 when specific parameters are met. In a non-limiting example, connector 104 may sense an overload of current from conductor 112. In such an example, connector 104 may send a command to lock coupling mechanism 116 to electrical vehicle port 120 to prevent unwanted electrical connections to conductor 112. In some embodiments, connector 104 may send a command to coupling mechanism 116 to lock to electrical vehicle port 120 while simultaneously sending a command to power supply circuit 108 to cut off any power being supplied to conductor 112. In some embodiments, coupling mechanism 116 may send feedback to connector 104 that a mating to electrical vehicle port 120 failed. Connector 104 may send a command to unlock coupling mechanism 116 from electrical vehicle port 120 if a failed mating is detected. In some embodiments, connector 104 may be configured to disconnect conductor 112 from power supply circuit 108 if coupling mechanism 116 is not engaged with electrical vehicle port 120.

Still referring to FIG. 1, in some embodiments, connector 104 may be configured to regulate power between conductor 112 and electrical vehicle port 120. Connector 104 may be configured to communicate with power supply circuit 108. Power supply circuit 108 may be configured to detect current and/or voltage levels of electrical components. In some embodiments, power supply circuit 108 may be configured to detect a current and/or voltage of conductor 112. Connector 104 may include a power threshold. A "power threshold" as used in this disclosure, is a current and/or voltage value that is a minimum or maximum value accepted by an electrical vehicle. In some embodiments, a power threshold may be determined by a user input on connector 104. In other embodiments, a power threshold may be stored in connector 104. In other embodiments, a power threshold may be communicated to connector 104 from electrical vehicle 116. In some embodiments, a power threshold may be communicated to connector 104 through a wired connection. In other embodiments, a power threshold may be communicated to connector 104 through a wireless connection. In other embodiments, a power threshold may be determined by a communication between electrical vehicle 116 and connector 104. In some embodiments, a power threshold may be adjusted during a charging of electrical vehicle 116. In a non-limiting example, electrical vehicle 116 may start off at a certain power limit. During a charging of electrical vehicle 116, power supply circuit 108 and/or electrical vehicle port 120 may provide feedback signals to connector 104 that a power limit should be raised or reduced. In some embodiments, a power threshold may include a time interval. In a non-limiting example, a power threshold may include 550V with a time interval of five seconds. In such an example, a power threshold may be reached after five seconds of a 550V power output. In some embodiments, a power threshold may include a relative percentage of a power output of conductor 112. In a non-limiting example, conductor 112 may be configured to output between 500V to 1000V. A power threshold may include a voltage at 110% of an output voltage of conductor 112. In some embodiments, a power threshold may include a voltage at 110% of an output voltage of conductor 112 over a time interval of five seconds. In some embodiments, power supply circuit 108 may include a surge protection component. A "surge protection component" as used in this disclosure is an electrical device configured to prevent a current overload. A surge component may include, but is not limited to, diodes, transistors, circuit breakers, fuses, and the like. In some embodiments, power supply circuit 108 may include a voltage clamping element. A "voltage clamping element" as used in this disclosure, is an electrical component that shifts a DC value of an electrical signal. A voltage clamping element may include a diode and/or capacitor. In some embodiments, a voltage clamping element may include an operational amplifier. A voltage clamping element may be configured to move an entire voltage signal higher or lower while retaining the voltage signals peak-to-peak value. A voltage clamping element may be configured to fix a peak-to-peak value of a voltage signal within a certain voltage reference level. A voltage clamping element may be used by power supply circuit 108 to prevent an output of conductor 112 from going above a maximum voltage value or below a minimum voltage value. In some embodiments, connector 104 may be configured to unlock coupling mechanism 116 at an unlocking voltage threshold. An "unlocking voltage threshold" as used in this disclosure is a specific electric potential that must be reached before a coupling mechanism disconnects from an electrical vehicle port. In some embodiments, an unlocking voltage threshold may be between 10 to 100V. In some embodiments, an unlocking power threshold may be 60V.

Figure 2:
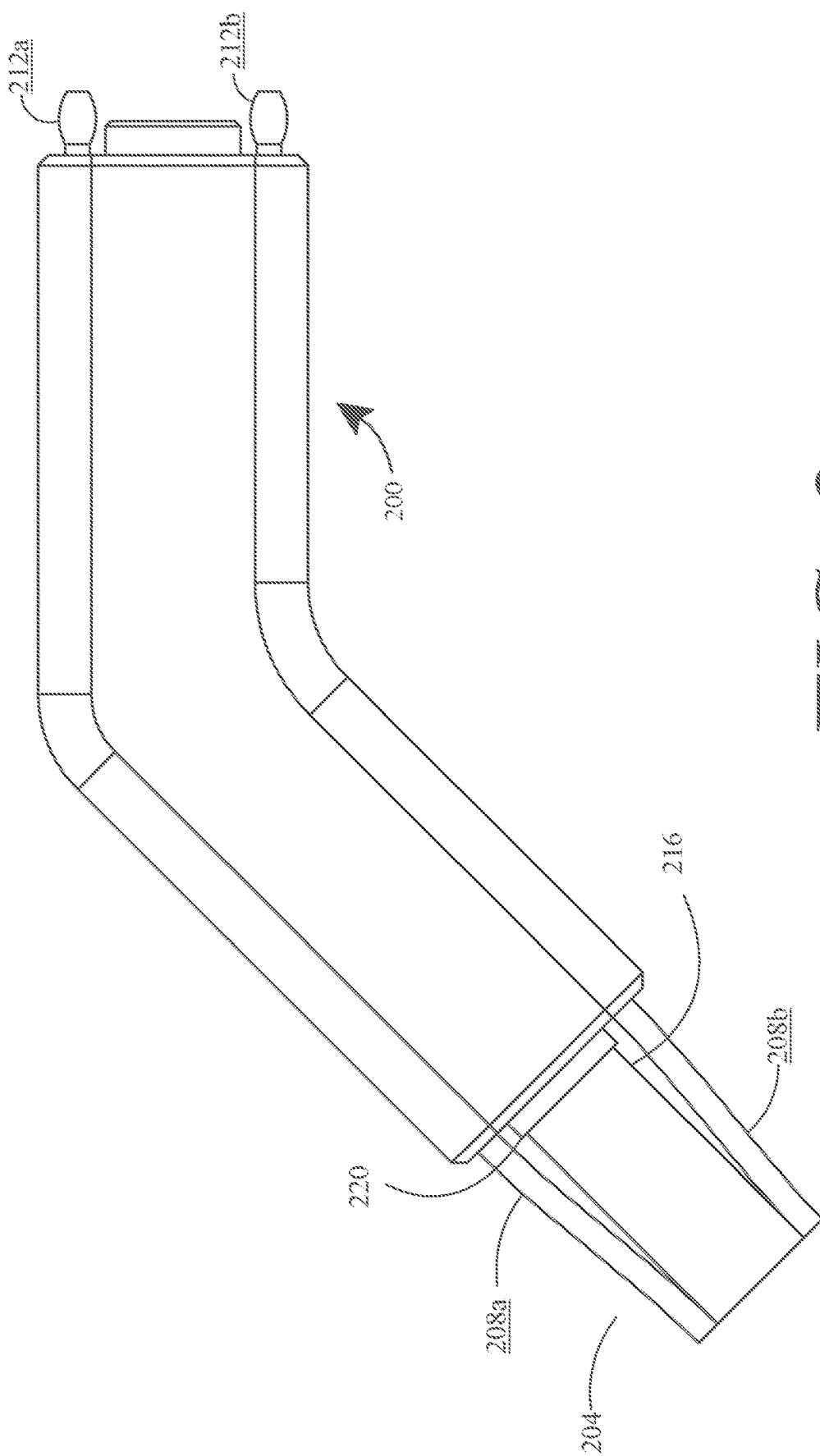
FIG. 2 illustrates an exemplary schematic of an exemplary connector for charging an electric vehicle.

Still referring to FIG. 1, in some embodiments, connector 104 may be configured to sense a failed charge event. A "failed charge event" as used in this disclosure is when a power supply is unable to be transferred from a connector to an electrical vehicle. In some embodiments, a failed charge event may include in incompatibility between connector 104 and electrical vehicle and/or electrical vehicle port 120. In some embodiments, a failed charge event may include a power overload of electrical vehicle port 120 and/or conductor 112. In some embodiments, a failed charge event may include an improper mating between coupling mechanism 116 and electrical vehicle port 120. In some embodiments, a failed charge event may include a data corruption of connector 104. A "data corruption" as used in this disclosure, is an error in computer data that occurs during writing, reading, storage, transmission, and/or processing, which introduces unintended changes to an original set of data. In some embodiments, a failed charge event may include a data corruption of electrical vehicle 116 and/or electrical vehicle port 120. In some embodiments, Referring now to FIG. 2, an exemplary connector 200 is schematically illustrated. Connector 200 is illustrated with a tether 204. Tether 204 may include one or more conductors. Tether 204 may include a conduit, for instance a jacket, enshrouding one or more conductors. In some embodiments, a conduit may be flexible, electrically insulating, and/or fluidically sealed. In some embodiments, connector 200 may include a first power conductor and a second power conductor. As used in this disclosure, a "power conductor" is a conductor configured to conduct an electrical charging current, for example a direct current and/or an alternating current. In some embodiments, connector 200 may include a direct current conductor 220. Direct current conductor 220 may be configured to conduct a direct current. In some embodiments, direct current conductor 220 may be positioned at an end of connector 200. In some embodiments, direct current conductor 220 may be positioned in any location and/or orientation in connector 200. In some cases, a conductor may include a cable and a contact. A cable may include any electrically conductive cable including without limitation cables containing copper and/or copper alloys. As used in this disclosure, a "contact" is an electrically conductive component that is configured to make physical contact with a mating electrically conductive component, thereby facilitating electrical communication between the contact and the mating component. In some cases, a contact may be configured to provide electrical communication with a mating component within a port. In some cases, a contact may contain copper and/or copper-alloy. In some cases, contact may include a coating. A contact coating may include without limitation hard gold, hard gold flashed palladium-nickel (e.g., 80/20), tin, silver, diamond-like carbon, and the like. In some embodiments, a first conductor may include a first cable 208a and a first contact 212a in electrical communication with the first cable. Likewise, a second conductor may include a second cable 208b and a second contact 212b in electrical communication with the second cable. In some embodiments, connector 200 may include a power supply circuit 216. A "power supply circuit" as used in this disclosure is a group of electrical components configured to regulate a voltage and current output. In some embodiments, power supply circuit 216 may be in electrical communication with direct current conductor 220. In some embodiments, power supply circuit 216 may be configured to be positioned in any location and/or orientation in connector 200.

Figure 3:
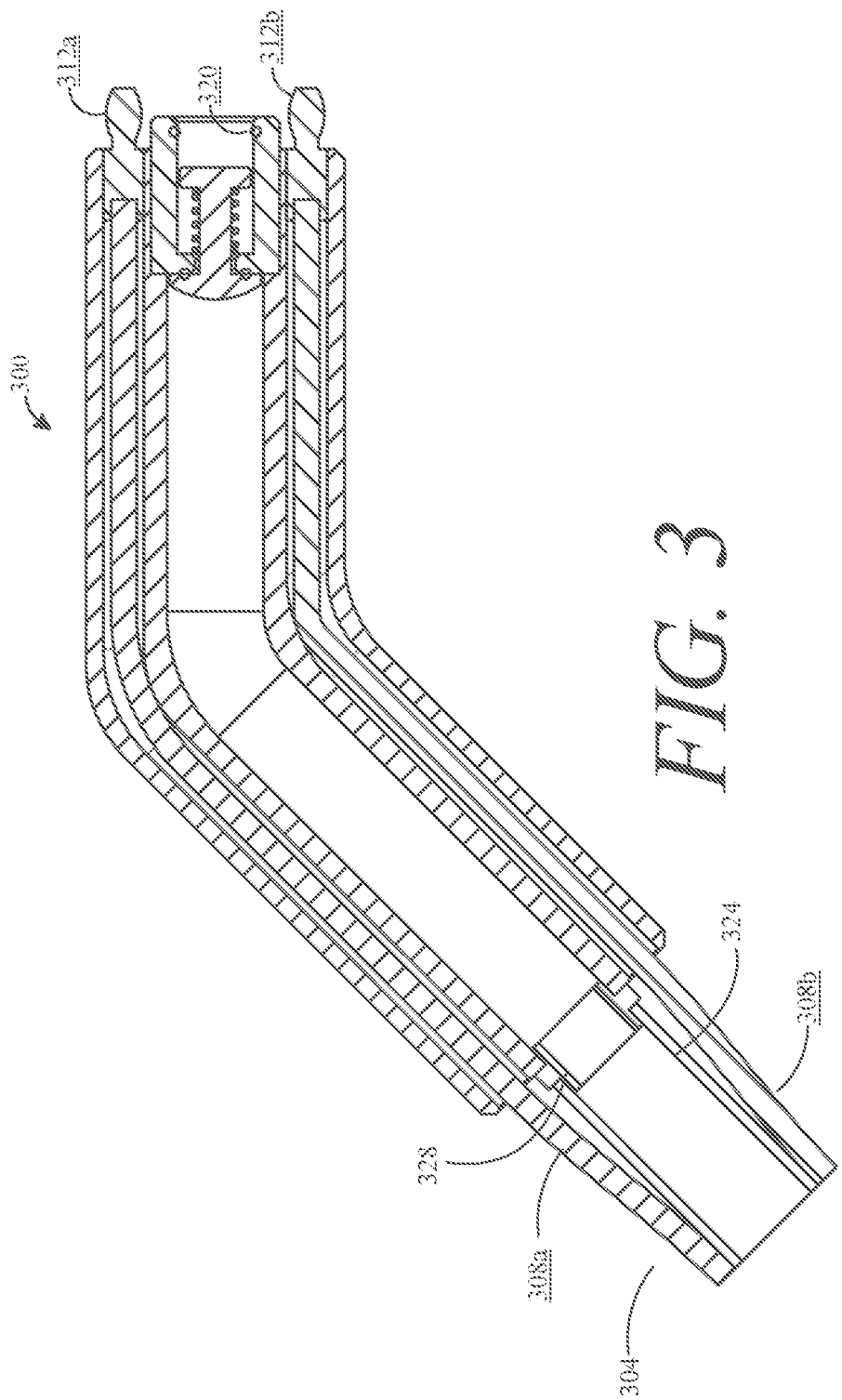
FIG. 3 is a cross-sectional view of an exemplary schematic of an exemplary connector for charging an electric vehicle.

Referring now to FIG. 3, an exemplary cross-sectional view of an exemplary connector 300 is illustrated. Connector 300 is illustrated with a tether 304. Tether 304 may include one or more conductors. Connector 300 may include a first power conductor and a second power conductor. A first conductor may include a first cable 308a and a first contact 312a in electrical communication with the first cable. Likewise, a second conductor may include a second cable 308b and a second contact 312b in electrical communication with the second cable. In some embodiments, connector 300 may include a direct current conductor 328. In some embodiments, direct current conductor 328 may be configured to conduct a direct current. In some embodiments, direct current conductor 328 may be configured to be in any location and/or orientation in connector 300. In some embodiments, connector 300 may include power supply circuit 328. Power supply circuit 328 may be configured to regulate a voltage and/or current output of connector 300. In some embodiments, power supply circuit 328 may be configured to be in any location and/or orientation in connector 300.

As shown in FIG. 3, in some cases, connector 300 may be configured to mate with a port. For example, connector 300 may include a fitting. In some cases, a fitting may include one or more seals 320. Seals 320 may include any seal described in this disclosure and may be configured to seal a joint between connector 300 and a mating component (e.g., fitting) within a port, when connector 300 is attached to the port. As used in this disclosure, a "seal" is a component that is substantially impermeable to a substance (e.g., coolant, air, and/or water) and is designed and/or configured to prevent flow of that substance at a certain location, e.g., joint. Seals 320 may be configured to seal liquid. In some cases, seals 320 may include at least one of a gasket, an O-ring, a mechanical fit (e.g., press fit or interference fit), and the like. In some cases, seals 320 may include an elastomeric material, for example without limitation silicone, buna-N, fluoroelastomer, fluorosilicone, polytetrafluoroethylene, polyethylene, polyurethane, rubber, ethylene propylene diene monomer, and the like. In some cases, seals 320 may include a compliant element, such as without limitation a spring or elastomeric material, to ensure positive contact of a seal 320 with a sealing face. In some cases, seals 320 may include a piston seal and/or a face seal. As used in this disclosure, a "joint" is a transition region between two components. For example in some cases, a cable and/or conductor may have a joint located between connector 300 and electric vehicle port.

With continued reference to FIG. 3, in some embodiments, connector 300 may include a valve 324. Valve 324 may include any type of valve, for example a mechanical valve, an electrical valve, a check valve, or the like. In some cases, valve 324 may include quick disconnect. In some cases, valve 324 may include a normally-closed vale, for example a mushroom-poppet style valve, as shown in FIG. 3. Additional non-limiting examples of normally-closed valves include solenoid valves, a spring-loaded valve, and the like. In some cases, a valve may include one or more of a ball valve, a butterfly valve, a body valve, a bonnet valve, a port valve, an actuator valve, a disc valve, a seat valve, a stem valve, a gasket valve, a trim valve, or the like. In some cases, valve 324 may be configured to open when connector 300 is attached to a port. In some embodiments, valve 324 may be configured to be open when connector 300 is mated with a mating component within a port. In some cases, valve 324 may be automatically opened/closed, for example by a controller. In some exemplary embodiments, mating of certain components within connector 300 and a port may occur in prescribed sequence. For example, in some cases, tether 304 may first be mated and sealed to its mating component within a port, before a valve 324 is opened and/or one or more conductors 312a-b are mated to their respective mating components within the port. In some cases, valve 324 may be configured not to open until after connection of one or more conductors 312a-b.

Figure 4:
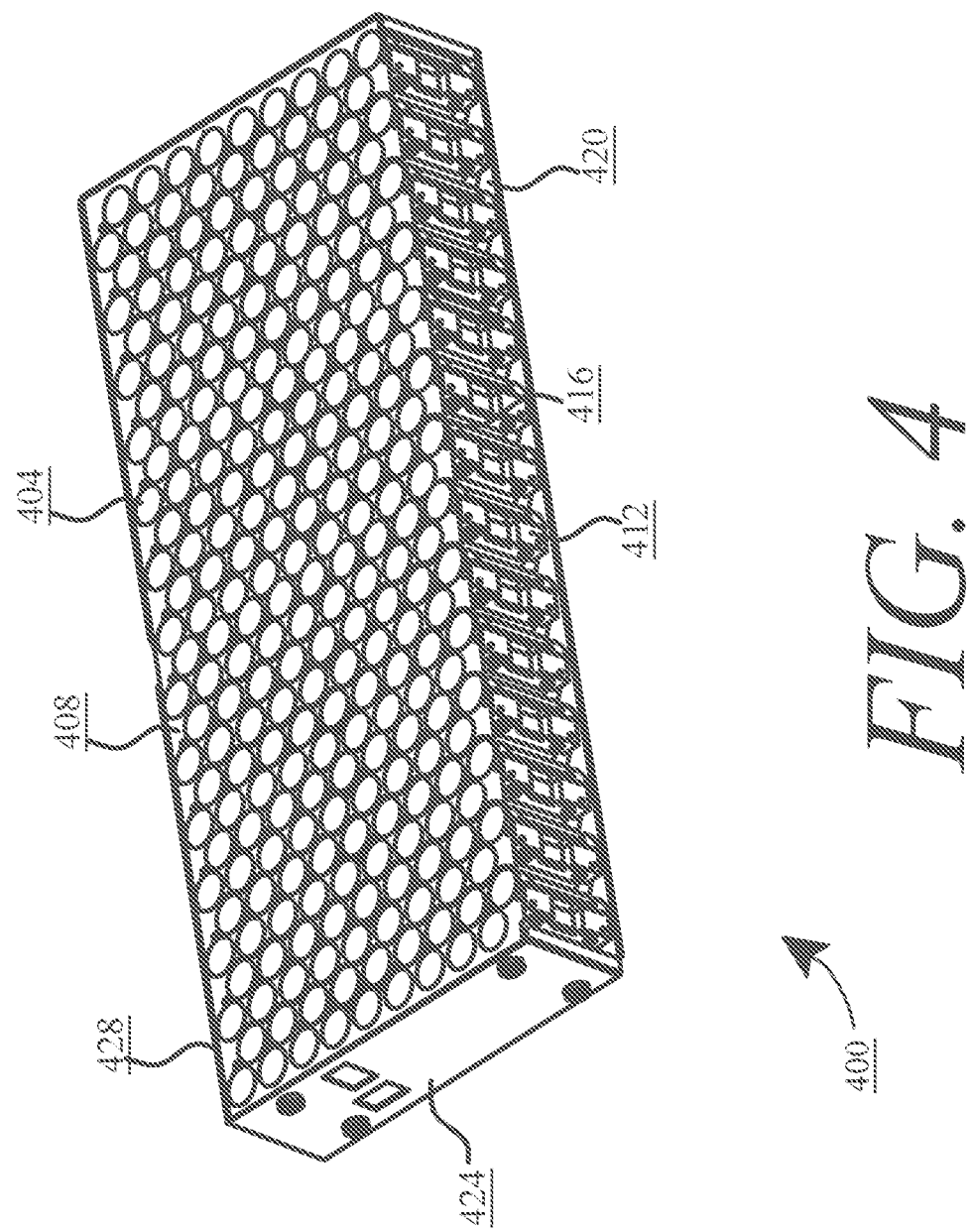
FIG. 4 schematically illustrates an exemplary battery module.

Referring now to FIG. 4, battery module 400 with multiple battery units 416 is illustrated, according to embodiments. Battery module 400 may comprise a battery cell 404, cell retainer 408, cell guide 412, protective wrapping, back plate 420, end cap 424, and side panel 428. Battery module 400 may comprise a plurality of battery cells, an individual of which is labeled 404. In embodiments, battery cells 404 may be disposed and/or arranged within a respective battery unit 416 in groupings of any number of columns and rows. For example, in the illustrative embodiment of FIG. 4, battery cells 404 are arranged in each respective battery unit 416 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 4 battery cells 404 are arranged 18 to battery unit 416 with a plurality of battery units 416 comprising battery module 400, one of skill in the art will understand that battery cells 404 may be arranged in any number to a row and in any number of columns and further, any number of battery units may be present in battery module 400. According to embodiments, battery cells 404 within a first column may be disposed and/or arranged such that they are staggered relative to battery cells 404 within a second column. In this way, any two adjacent rows of battery cells 404 may not be laterally adjacent but instead may be respectively offset a predetermined distance. In embodiments, any two adjacent rows of battery cells 404 may be offset by a distance equal to a radius of a battery cell. This arrangement of battery cells 404 is only a non-limiting example and in no way preclude other arrangement of battery cells.

In embodiments, and still referring to FIG. 4, battery cells 404 may be fixed in position by cell retainer 408. For the illustrative purposed within FIG. 4, cell retainer 408 is depicted as the negative space between the circles representing battery cells 404. Cell retainer 408 comprises a sheet further comprising circular openings that correspond to the cross-sectional area of an individual battery cell 404. Cell retainer 408 comprises an arrangement of openings that inform the arrangement of battery cells 404. In embodiments, cell retainer 408 may be configured to non-permanently, mechanically couple to a first end of battery cell 404.

With continued reference to FIG. 4, according to embodiments, battery module 400 may further comprise a plurality of cell guides 412 corresponding to each battery unit 416. Cell guide 412 may comprise a solid extrusion with cutouts (e.g. scalloped) corresponding to the radius of the cylindrical battery cell 404. Cell guide 412 may be positioned between the two columns of a battery unit 416 such that it forms a surface (e.g. side surface) of the battery unit 416. In embodiments, the number of cell guides 412 therefore match in quantity to the number of battery units 416. Cell guide 412 may comprise a material suitable for conducting heat.

Still referring to FIG. 4, battery module 400 may also comprise a protective wrapping woven between the plurality of battery cells 404. Protective wrapping may provide fire protection, thermal containment, and thermal runaway during a battery cell malfunction or within normal operating limits of one or more battery cells 404 and/or potentially, battery module 400 as a whole. Battery module 400 may also comprise a backplate 420. Backplate 420 is configured to provide structure and encapsulate at least a portion of battery cells 404, cell retainers 408, cell guides 412, and protective wraps. End cap 424 may be configured to encapsulate at least a portion of battery cells 404, cell retainers 408, cell guides 412, and battery units 416, as will be discussed further below, end cap may comprise a protruding boss that clicks into receivers in both ends of back plate 420, as well as a similar boss on a second end that clicks into sense board. Side panel 428 may provide another structural element with two opposite and opposing faces and further configured to encapsulate at least a portion of battery cells 404, cell retainers 408, cell guides 412, and battery units 416.

Still referring to FIG. 4, in embodiments, battery module 400 can include one or more battery cells 404. In another embodiment, battery module 400 comprises a plurality of individual battery cells 404. Battery cells 404 may each comprise a cell configured to include an electrochemical reaction that produces electrical energy sufficient to power at least a portion of an electric aircraft and/or a cart 100. Battery cell 404 may include electrochemical cells, galvanic cells, electrolytic cells, fuel cells, flow cells, voltaic cells, or any combination thereof—to name a few. In embodiments, battery cells 404 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 404 may use the term 'wired', but one of ordinary skill in the art would appreciate that this term is synonymous with 'electrically connected', and that there are many ways to couple electrical elements like battery cells 404 together. As an example, battery cells 404 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 404 may be wired in a series-parallel circuit which combines characteristics of the constituent circuit types to this combination circuit. Battery cells 404 may be electrically connected in any arrangement which may confer onto the system the electrical advantages associated with that arrangement such as high-voltage applications, high-current applications, or the like.

Still referring to FIG. 4, as used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other. According to embodiments and as discussed above, any two rows of battery cells 404 and therefore cell retainer 408 openings are shifted one half-length so that no two battery cells 404 are directly next to the next along the length of the battery module 400, this is the staggered arrangement presented in the illustrated embodiment of FIG. 4. Cell retainer 408 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 408 may comprise staggered openings that align with battery cells 404 and further configured to hold battery cells 404 in fixed positions. Cell retainer 408 may comprise an injection molded component. Injection molded component may comprise a component manufactured by injecting a liquid into a mold and letting it solidify, taking the shape of the mold in its hardened form. Cell retainer 408 may comprise liquid crystal polymer, polypropylene, polycarbonate, acrylonitrile butadiene styrene, polyethylene, nylon, polystyrene, polyether ether ketone, to name a few. Cell retainer 408 may comprise a second cell retainer fixed to the second end of battery cells 404 and configured to hold battery cells 404 in place from both ends. The second cell retainer may comprise similar or the exact same characteristics and functions of first cell retainer 408. Battery module 400 may also comprise cell guide 412. Cell guide 412 includes material disposed in between two rows of battery cells 404. In embodiments, cell guide 412 can be configured to distribute heat that may be generated by battery cells 404.

Still referring to FIG. 4, according to embodiments, battery module 400 may also comprise back plate 420. Back plate 420 is configured to provide a base structure for battery module 400 and may encapsulate at least a portion thereof. Backplate 420 can have any shape and includes opposite, opposing sides with a thickness between them. In embodiments, back plate 420 may comprise an effectively flat, rectangular prism shaped sheet. For example, back plate 420 can comprise one side of a larger rectangular prism which characterizes the shape of battery module 400 as a whole. Back plate 420 also comprises openings correlating to each battery cell 404 of the plurality of battery cells 404. Back plate 420 may comprise a lamination of multiple layers. The layers that are laminated together may comprise FR-4, a glass-reinforced epoxy laminate material, and a thermal barrier of a similar or exact same type as disclosed hereinabove. Back plate 420 may be configured to provide structural support and containment of at least a portion of battery module 400 as well as provide fire and thermal protection.

With continued reference to FIG. 4, according to embodiments, battery module 400 may also include first end cap 424 configured to encapsulate at least a portion of battery module 400. End cap 424 may provide structural support for battery module 400 and hold back plate 420 in a fixed relative position compared to the overall battery module 400. End cap 424 may comprise a protruding boss on a first end that mates up with and snaps into a receiving feature on a first end of back plate 420. End cap 424 may comprise a second protruding boss on a second end that mates up with and snaps into a receiving feature on sense board. Battery module 400 may also include at least a side panel 428 that may encapsulate two sides of battery module 400. Side panel 428 may comprise opposite and opposing faces comprising a metal or composite material. In the illustrative embodiment of FIG. 4, a second side panel 428 is present but not illustrated so that the inside of battery module 400 may be presented. Side panel(s) 428 may provide structural support for battery module 400 and provide a barrier to separate battery module 400 from exterior components within aircraft or environment.

Figure 5:
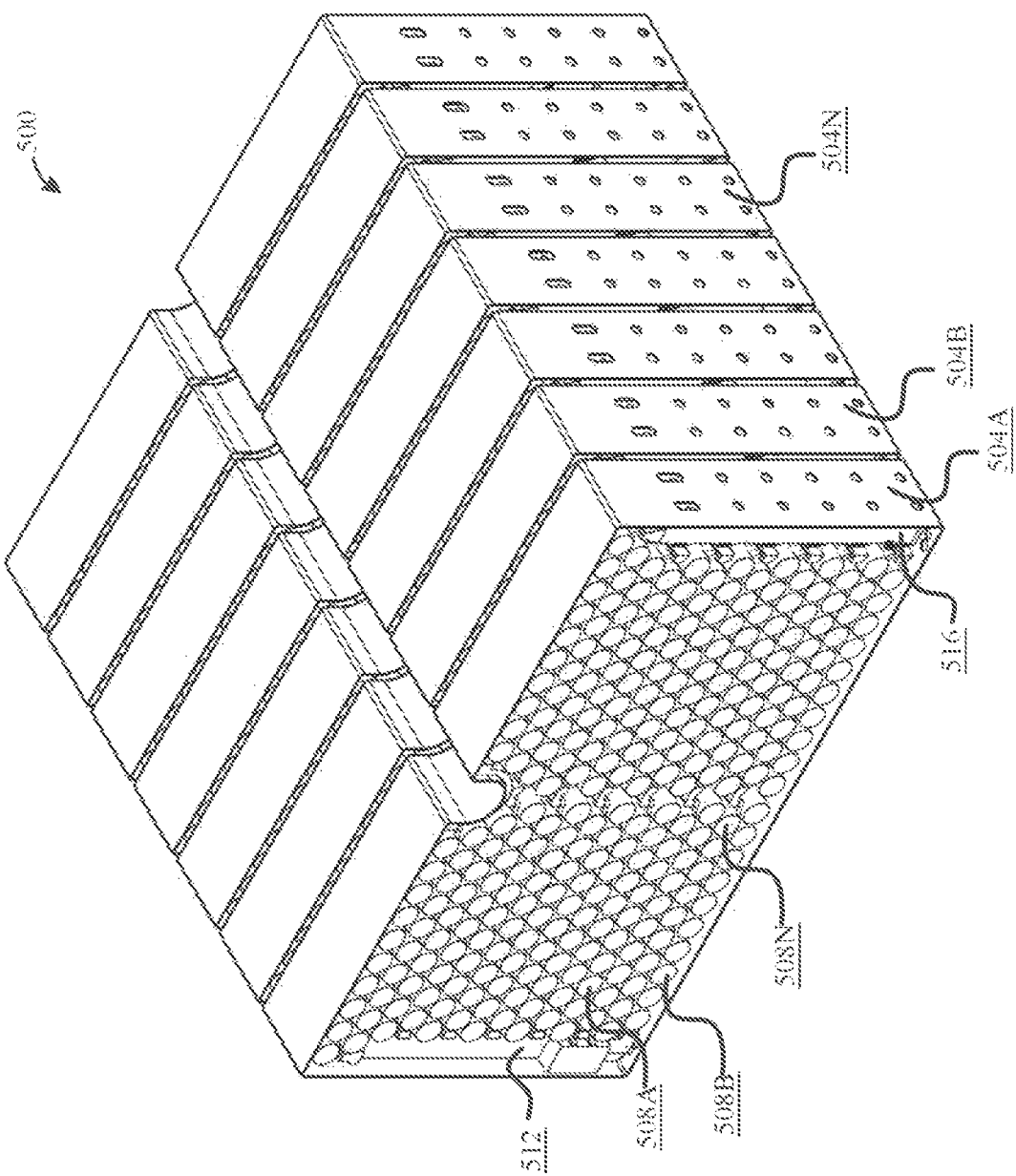
FIG. 5 is perspective drawings illustrating a battery pack, according to embodiments.

Referring now to FIG. 5, a perspective drawing of an embodiment of a battery pack with a plurality of battery modules disposed therein 500. The configuration of battery pack 500 is merely exemplary and should in no way be considered limiting. Battery pack 500 is configured to facilitate the flow of the media through each battery module of the plurality of battery modules to cool the battery pack. Battery pack 500 can include one or more battery modules 504A-N. Battery pack 500 is configured to house and/or encase one or more battery modules 504A-N. Each battery module of the plurality of battery modules 504A-N may include any battery module as described in further detail in the entirety of this disclosure. As an exemplary embodiment, FIG. 5 illustrates 7 battery modules 504A-N creating battery pack 500, however, a person of ordinary skill in the art would understand that any number of battery modules 504A-N may be housed within battery pack 500. In an embodiment, each battery module of the plurality of battery modules 504A-N can include one or more battery cells 508A-N. Each battery module 504A-N is configured to house and/or encase one or more battery cells 508A-N. Each battery cell of the plurality of battery cells 508A-N may include any battery cell as described in further detail in the entirety of this disclosure. Battery cells 508A-N may be configured to be contained within each battery module 504A-N, wherein each battery cell 508A-N is disposed in any configuration without limitation. As an exemplary embodiment, FIG. 5 illustrates 240 battery cells 508A-N housed within each battery module 504A-N, however, a person of ordinary skill in the art would understand that any number of battery units 508A-N may be housed within each battery module 504A-N of battery pack 500. Further, each battery module of the plurality of battery modules 504A-N of battery pack 500 includes circuit 512. Circuit 512 may include any circuit as described in further detail in the entirety of this disclosure. Each battery module of the plurality of battery modules 504A-N further includes second circuit 516. Second circuit 516 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

Figure 6:
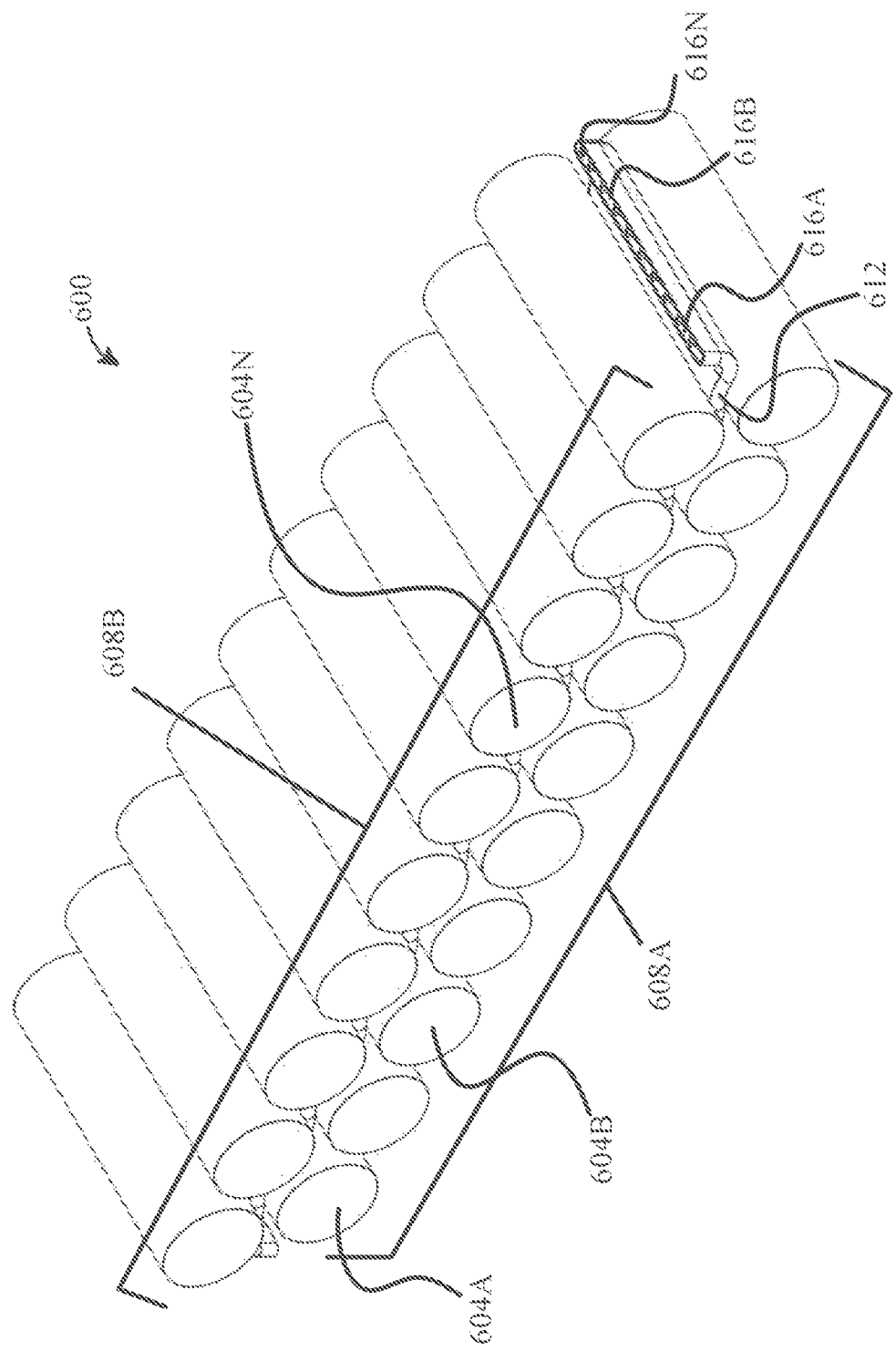
FIG. 6 is a perspective view illustrating a battery unit, according to embodiments.

Referring now to FIG. 6, a perspective view of an embodiment battery unit 600 is illustrated. Battery unit 600 may be configured to couple to one or more other battery units, wherein the combination of two or more battery units 600 forms at least a portion of vehicle battery and/or charging battery. Battery unit 600 is configured to include a plurality of battery cells 604A-N. The plurality of battery cells 604A-N may include any battery cell as described in the entirety of this disclosure. In the instant embodiment, for example and without limitation, battery unit 600 includes a first row 608A of battery cells 604A-N, wherein first row 608A of battery cells 604A-N is in contact with the first side of the thermal conduit, as described in further detail below. As a non-limiting example, row 608A of battery cells 604A-N is configured to contain ten columns of battery cells. Further, in the instant embodiment, for example and without limitation, battery unit 600 includes a second row 608B of battery cells 604A-N, wherein second row 608B of battery cells 604A-N is in contact with the second side of the thermal conduit, as described in further detail below. As a non-limiting example, second row 608B of battery cells 604A-N is configured to contain ten columns of battery cells. In the embodiment of FIG. 6, battery unit 600 is configured to contain twenty battery cells 604A-N in first row 608A and second row 608B. Battery cells 604A-N of battery unit 600 may be arranged in any configuration, such that battery unit 600 may contain any number of rows of battery cells and any number of columns of battery cells. Though the illustrated embodiment of FIG. 6 presents one arrangement for battery unit 600, one of skill in the art will understand that any number of arrangements may be used. In embodiments, battery unit 600 may contain any offset of distance between first row 608A of battery cells 604A-N and second row 608B of battery cells 604A-N, wherein the battery cells 604A-N of first row 608A and the battery cells 604A-N of second row 608B are not centered with each other. In the instant embodiment, for example and without limitation, battery unit 600 includes first row 608A and adjacent second row 608B each containing ten battery cells 604A-N, each battery cell 604 of first row 608A and each battery cell 604 of second row 608B are shifted a length measuring the radius of a battery cell, wherein the center of each battery cell 604 of first row 608A and each battery cell 604 of second row 608B are separated from the center of the battery cell in the adjacent column by a length equal to the radius of the battery cell. As a further example and without limitation, each battery cell of 604 of first row 608A and each battery cell 604 of second row 608B are shifted a length measuring a quarter the diameter of each battery cell, wherein the center of each battery cell of first row 608A and each battery cell of second row 608B are separated from the center of a battery cell in the adjacent column by a length equal to a quarter of the diameter of the battery cell. First row 608A of battery cells 604A-N and second row 608B of battery cells 604A-N of the at least a battery unit may be configured to be fixed in a position by utilizing a cell retainer, as described in the entirety of this disclosure. The arrangement of the configuration of each battery cell 604A-N of first row 608A and each battery cell 604A-N of second row 608B of battery unit 600 in FIG. 6 is a non-limiting embodiment and in no way precludes other arrangements of each battery cell 604A-N of first row 608A and/or second row 608B. Each battery cell 604A-B may be connected utilizing any means of connection as described in the entirety of this disclosure. Persons skilled in the art, upon reviewing the entirety of this disclosure, will be aware of electrical connections that may be used as to connect each battery cell consistently with this disclosure.

Still referring to FIG. 6, in embodiments, battery unit 600 can include thermal conduit 612, wherein thermal conduit 612 has a first surface and a second opposite and opposing surface. Thermal conduit 612 may include any thermal conduit as described above. The height of thermal conduit 612 may not exceed the height of battery cells 604A-N, as described in the entirety of this disclosure. For example and without limitation, in the embodiment of FIG. 6, the thermal conduit 612 is at a height that is equal to the height of each battery cell 604 of first row 608A and second row 608B. Thermal conduit 612 may be composed of any suitable material, as described above in further detail. Thermal conduit 612 is configured to include an indent in the component for each battery cell 604 coupled to the first surface and/or the second surface of thermal conduit 612. Persons skilled in the art, upon reviewing the entirety of this disclosure, will be aware of components that may be used as thermal conduits consistently with this disclosure.

With continued reference to FIG. 6, thermal conduit 612, in embodiments, includes at least a passage 616A-N, wherein the at least a passage 616A-N comprises an opening starting at the first end of thermal conduit 612 and terminating at a second, opposing end of thermal conduit 612. The "passage", as described herein, is a horizontal channel with openings on each end of the thermal conduit. The at least a passage 616A-N is configured to have a hollow shape comprising one or more sides, at least two ends (e.g. a top and a bottom), and a length, wherein the hollow shape comprises a void having a shape the same as or different from the shape of the at least a passage 616A-N and terminating at an opposite, opposing second end of the shape. For example and without limitation, in the illustrative embodiment of FIG. 6, the at least a passage 616A-N comprise a rectangle shaped tubular shape. In embodiments, the tubular component runs effectively perpendicular to each battery cell 604A-N. In embodiments, the at least a passage 616A-N can be disposed such that it forms a void originating at a first side of the battery module and terminating at the second, opposite, and opposing side, of the battery module. According to embodiments, the at least a passage 616A-N and/or thermal conduit 612 may be composed utilizing any suitable material. For example and without limitation, thermal conduit 612 and/or the at least a passage 616A-N may be composed of polypropylene, polycarbonate, acrylonitrile butadiene styrene, polyethylene, nylon, polystyrene, polyether ether ketone, and the like.

Continuing to refer to FIG. 6, in embodiments, the at least a passage 616A-N may be disposed in the thermal conduit 612 such that the at least a passage is configured to allow the travel of a media from a first end of thermal conduit 612 to the second, opposite, and opposite end of thermal conduit 612. For example, the at least a passage 616A-N can be disposed to allow the passage of the media through the hollow opening/void of the at least a passage 616A-N. The media may include any media as described in the entirety of this disclosure. The hollow opening of thermal conduit 612 and/or the at least a passage 616A-N may be configured to be of any size and/or diameter. For example and without limitation, the hollow opening of the at least a passage 616A-N may be configured to have a diameter that is equal to or less than the radius of each battery cell 604A-N. The at least a passage 616A-N and/or thermal conduit 612 may have a length equal or less than the length of one row of battery cells 604A-N such that thermal conduit and/or the at least a passage is configured to not exceed the length of first row 608A and/or second row 608B of battery cells 604A-N. The opening of the at least a passage 616A-N can be configured to be disposed at each end of thermal conduit 612, wherein the at least a passage 616A-N may be in contact with each battery cell 604A-N in a respective battery unit 600 located at the end of each column and/or row of the battery unit 600. For example and without limitation, in the illustrative embodiment of FIG. 6, a battery unit 600 can contain two rows with ten columns of battery cells 604A-N and the opening of the at least a passage 616A-N on each end of thermal conduit 612 that is in contact with a respective battery cell 604A-N at the end of each of the two columns. Persons skilled in the art, upon reviewing the entirety of this disclosure, will be aware of various components that may be used as at least a passage consistently with this disclosure.

Figure 7:
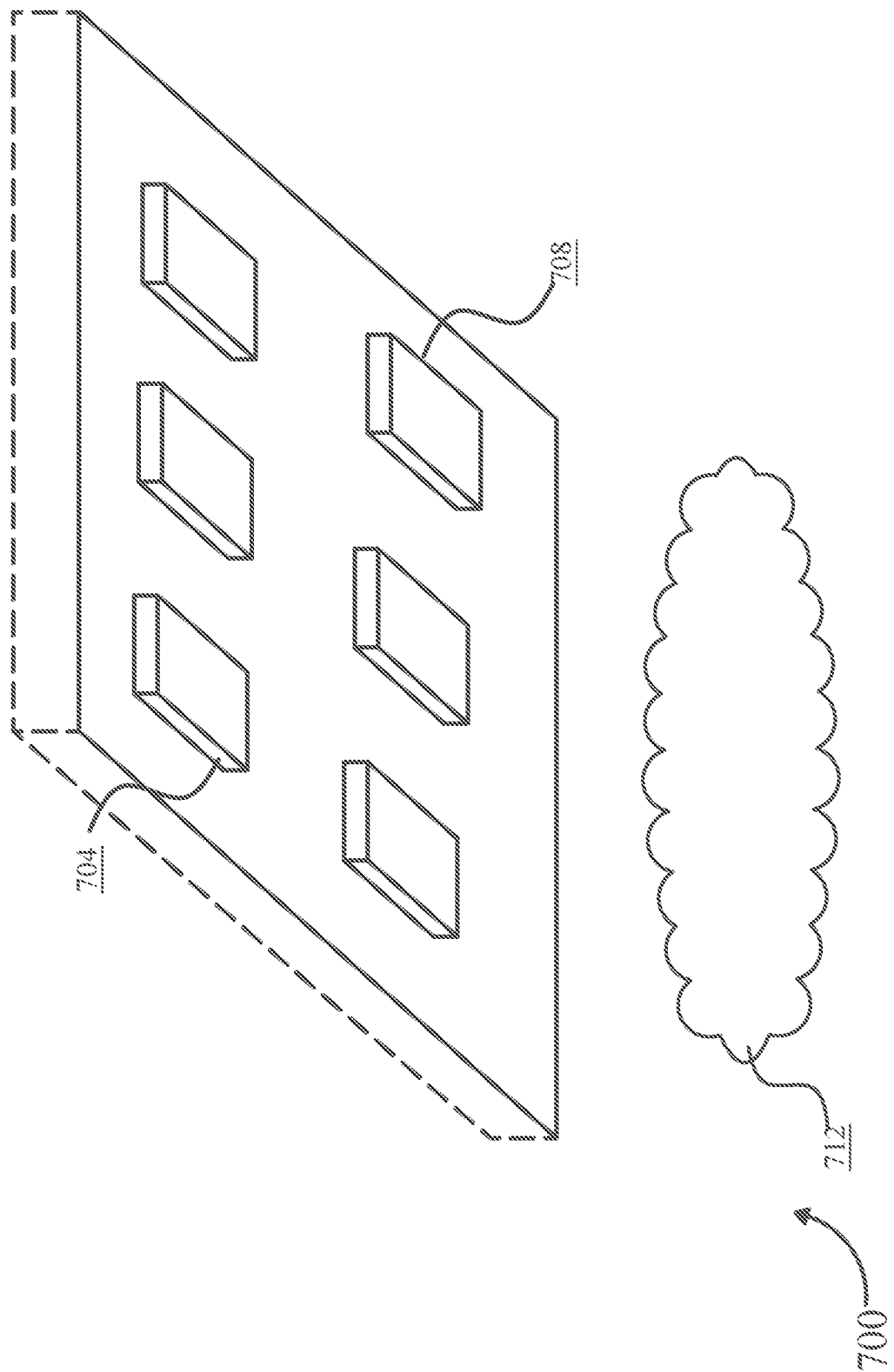
FIG. 7 is a block diagram illustrating an exemplary sensor suite.

Referring now to FIG. 7, an embodiment of sensor suite 700 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with a vehicle battery or an electrical energy storage system, such as without limitation charging battery. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of controller 104 and/or user to detect phenomenon is maintained.

With continued reference to FIG. 7, sensor suite 700 may include a humidity sensor 704. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Humidity sensor 704 may be psychrometer. Humidity sensor 704 may be a hygrometer. Humidity sensor 704 may be configured to act as or include a humidistat. A "humidistat", for the purposes of this disclosure, is a humidity-triggered switch, often used to control another electronic device. Humidity sensor 704 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 7, sensor suite 700 may include multimeter 708. Multimeter 708 may be configured to measure voltage across a component, electrical current through a component, and resistance of a component. Multimeter 708 may include separate sensors to measure each of the previously disclosed electrical characteristics such as voltmeter, ammeter, and ohmmeter, respectively.

Alternatively or additionally, and with continued reference to FIG. 7, sensor suite 700 may include a sensor or plurality thereof that may detect voltage and direct charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 700 and/or a control circuit incorporated therein and/or communicatively connected thereto may be configured to adjust charge to one or more battery cells as a function of a charge level and/or a detected parameter. For instance, and without limitation, sensor suite 700 may be configured to determine that a charge level of a battery cell is high based on a detected voltage level of that battery cell or portion of the battery pack. Sensor suite 700 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 700 may include digital sensors, analog sensors, or a combination thereof. Sensor suite 700 may include digital-to-analog converters (DAC), analog-to-digital converters (ADC, A/D, A-to-D), a combination thereof, or other signal conditioning components used in transmission of a battery sensor signal to a destination over wireless or wired connection.

With continued reference to FIG. 7, sensor suite 700 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 700, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 7, sensor suite 700 may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure 712 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 700, may be configured to detect combustible, flammable, toxic, oxygen depleted, a combination thereof, or another type of gas alone or in combination. The gas sensor that may be present in sensor suite 700 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 700 may include sensors that are configured to detect non-gaseous byproducts of catastrophic cell failure 712 including, in non-limiting examples, liquid chemical leaks including aqueous alkaline solution, ionomer, molten phosphoric acid, liquid electrolytes with redox shuttle and ionomer, and salt water, among others. Sensor suite 700 may include sensors that are configured to detect non-gaseous byproducts of catastrophic cell failure 712 including, in non-limiting examples, electrical anomalies as detected by any of the previous disclosed sensors or components.

With continued reference to FIG. 7, sensor suite 700 may be configured to detect events where voltage nears an upper voltage threshold or lower voltage threshold. The upper voltage threshold may be stored in data storage system for comparison with an instant measurement taken by any combination of sensors present within sensor suite 700. The upper voltage threshold may be calculated and calibrated based on factors relating to battery cell health, maintenance history, location within battery pack, designed application, and type, among others. Sensor suite 700 may measure voltage at an instant, over a period of time, or periodically. Sensor suite 700 may be configured to operate at any of these detection modes, switch between modes, or simultaneous measure in more than one mode. Connector 104 may detect through sensor suite 700 events where voltage nears the lower voltage threshold. The lower voltage threshold may indicate power loss to or from an individual battery cell or portion of the battery pack. Connector 104 may detect through sensor suite 700 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

With continued reference to FIG. 7, in some cases, sensor suite 700 may include a swell sensor configured to sense swell, pressure, or strain of at least a battery cell. In some cases, battery cell swell, pressure, and/or strain may be indicative of an amount of gases and/or gas expansion within a battery cell. Battery swell sensor may include one or more of a pressure sensor, a load cell, and a strain gauge. In some cases, battery swell sensor may output a battery swell signal that is analog and requires signal processing techniques. For example, in some cases, wherein battery swell sensor includes at least a strain gauge, battery swell signal may be processed and digitized by one or more of a Wheatstone bridge, an amplifier, a filter, and an analog to digital converter. In some cases, battery sensor signal may include battery swell signal.

Figure 8:
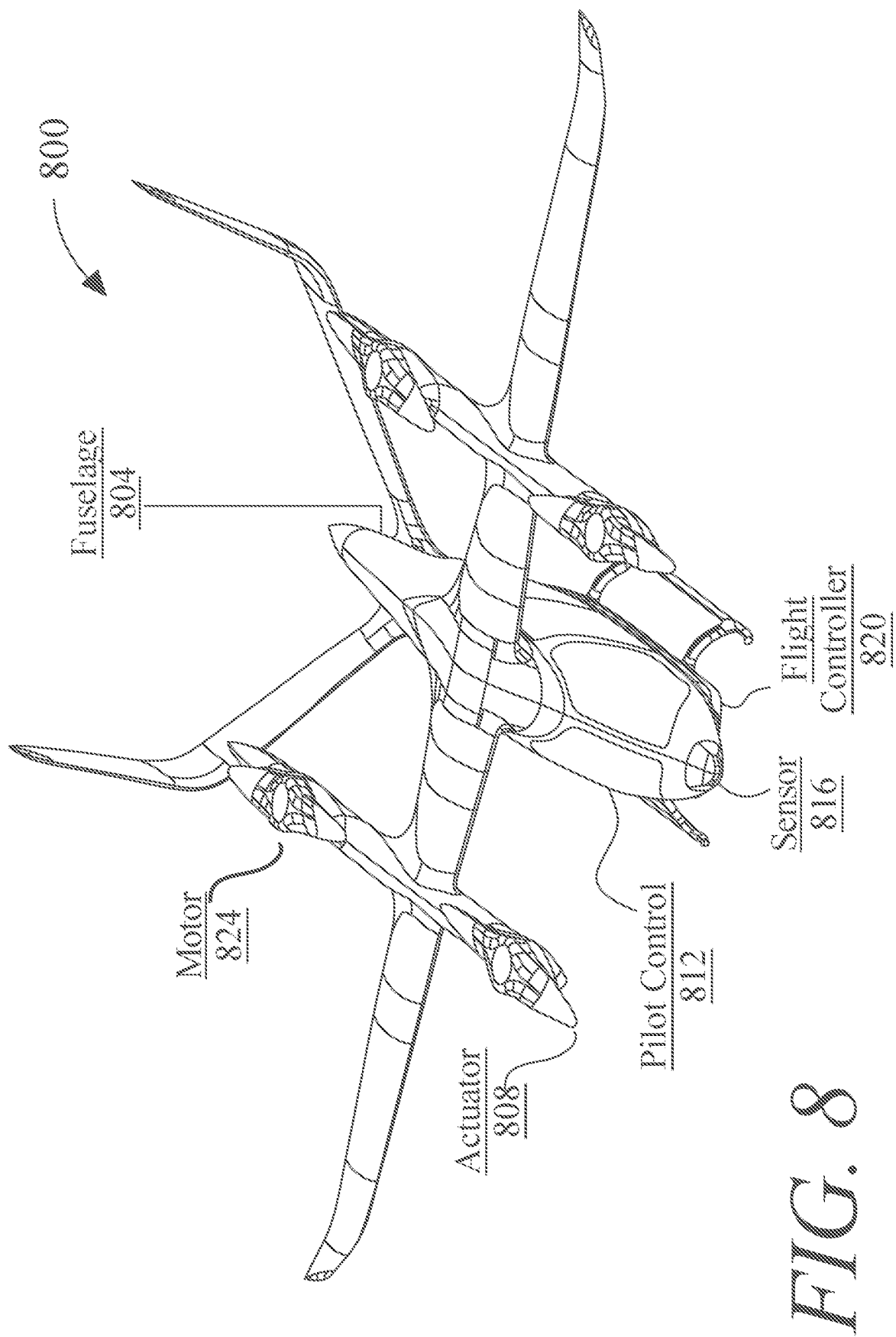
FIG. 8 is a schematic of an exemplary electric aircraft.

Referring now to FIG. 8, an exemplary embodiment of an aircraft 800 is illustrated. Aircraft 800 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 8, aircraft 800 may include a fuselage 804. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 804 may comprise structural elements that physically support the shape and structure of an aircraft. Structural elements may take a plurality of forms, alone or in combination with other types. Structural elements may vary depending on the construction type of aircraft and specifically, the fuselage. Fuselage 804 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 8, aircraft 800 may include a plurality of actuators 808. Actuator 808 may include any motor and/or propulsor described in this disclosure. In an embodiment, actuator 808 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is a vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 8, a plurality of actuators 808 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 808 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 808 may include a rudder, which may include, without limitation, a segmented rudder that produces a torque about a vertical axis. Additionally or alternatively, plurality of actuators 808 may include other flight control surfaces such as propulsors, rotating flight controls, or any other structural features which can adjust movement of aircraft 800. Plurality of actuators 808 may include one or more rotors, turbines, ducted fans, paddle wheels, and/or other components configured to propel a vehicle through a fluid medium including, but not limited to air.

Still referring to FIG. 8, plurality of actuators 808 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 8, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 8, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 8, plurality of actuators 808 may include power sources, control links to one or more elements, fuses, and/or mechanical couplings used to drive and/or control any other flight component. Plurality of actuators 808 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 8, plurality of actuators 808 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 8, an energy source may be used to provide a steady supply of electrical power to a load over a flight by an electric aircraft 800. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 8, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 8, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 8, another exemplary actuator may include landing gear. Landing gear may be used for take-off and/or landing/Landing gear may be used to contact ground while aircraft 800 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 8, aircraft 800 may include a pilot control 812, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 808. For example and without limitation, collective control may alter and/or adjust the pitch angle of all of the main rotor blades collectively. For example, and without limitation pilot control 812 may include a yoke control. As used in this disclosure a "yoke control" is a mechanical control of an aircraft to control the pitch and/or roll. For example and without limitation, yoke control may alter and/or adjust the roll angle of aircraft 800 as a function of controlling and/or maneuvering ailerons. In an embodiment, pilot control 812 may include one or more footbrakes, control sticks, pedals, throttle levels, and the like thereof. In another embodiment, and without limitation, pilot control 812 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 800 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 800 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 8, pilot control 812 may be configured to modify a variable pitch angle. For example, and without limitation, pilot control 812 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 812 may modify the variable pitch angle from a first angle of 2.71° to a second angle of 3.82°. Additionally or alternatively, pilot control 812 may be configured to translate a pilot desired torque for flight component 808. For example, and without limitation, pilot control 812 may translate that a pilot's desired torque for a propeller be 160 lb. ft. of torque. As a further non-limiting example, pilot control 812 may introduce a pilot's desired torque for a propulsor to be 290 lb. ft. of torque. Additional disclosure related to pilot control 812 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 8, aircraft 800 may include a loading system. A loading system may include a system configured to load an aircraft of either cargo or personnel. For instance, some exemplary loading systems may include a swing nose, which is configured to swing the nose of aircraft 800 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 8, aircraft 800 may include a sensor 816. Sensor 816 may include any sensor or noise monitoring circuit described in this disclosure. Sensor 816 may be configured to sense a characteristic of pilot control 812. Sensor may be a device, module, and/or subsystem, utilizing any hardware, software, and/or any combination thereof to sense a characteristic and/or changes thereof, in an instant environment, for instance without limitation a pilot control 812, which the sensor is proximal to or otherwise in a sensed communication with, and transmit information associated with the characteristic, for instance without limitation digitized data. Sensor 816 may be mechanically and/or communicatively coupled to aircraft 800, including, for instance, to at least a pilot control 812. Sensor 816 may be configured to sense a characteristic associated with at least a pilot control 812. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 816 may include at least a geospatial sensor. Sensor 816 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 800 for both critical and non-critical functions. Sensor may be incorporated into vehicle or aircraft or be remote.

Still referring to FIG. 8, in some embodiments, sensor 816 may be configured to sense a characteristic associated with any pilot control described in this disclosure. Non-limiting examples of a sensor 816 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 816 may sense a characteristic as an analog measurement, for instance, yielding a continuously variable electrical potential indicative of the sensed characteristic. In these cases, sensor 816 may additionally comprise an analog to digital converter (ADC) as well as any additionally circuitry, such as without limitation a Whetstone bridge, an amplifier, a filter, and the like. For instance, in some cases, sensor 816 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 800, for instance without limitation a computing system, a pilot display, and a memory component. Alternatively or additionally, sensor 816 may sense a characteristic of a pilot control 812 digitally. For instance in some embodiments, sensor 816 may sense a characteristic through a digital means or digitize a sensed signal natively. In some cases, for example, sensor 816 may include a rotational encoder and be configured to sense a rotational position of a pilot control; in this case, the rotational encoder digitally may sense rotational "clicks" by any known method, such as without limitation magnetically, optically, and the like.

Still referring to FIG. 8, electric aircraft 800 may include at least a motor 824, which may be mounted on a structural feature of the aircraft. Design of motor 824 may enable it to be installed external to structural member (such as a boom, nacelle, or fuselage) for easy maintenance access and to minimize accessibility requirements for the structure.; this may improve structural efficiency by requiring fewer large holes in the mounting area. In some embodiments, motor 824 may include two main holes in top and bottom of mounting area to access bearing cartridge. Further, a structural feature may include a component of electric aircraft 800. For example, and without limitation structural feature may be any portion of a vehicle incorporating motor 824, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 808. Persons skilled in the art, upon reviewing the entirety of this disclosure, will be aware of various materials, combinations of materials, and/or constructions techniques.

Still referring to FIG. 8, electric aircraft 800 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 8, a number of aerodynamic forces may act upon the electric aircraft 800 during flight. Forces acting on electric aircraft 800 during flight may include, without limitation, thrust, the forward force produced by the rotating element of the electric aircraft 800 and acts parallel to the longitudinal axis. Another force acting upon electric aircraft 800 may be, without limitation, drag, which may be defined as a rearward retarding force which is caused by disruption of airflow by any protruding surface of the electric aircraft 800 such as, without limitation, the wing, rotor, and fuselage. Drag may oppose thrust and acts rearward parallel to the relative wind. A further force acting upon electric aircraft 800 may include, without limitation, weight, which may include a combined load of the electric aircraft 800 itself, crew, baggage, and/or fuel. Weight may pull electric aircraft 800 downward due to the force of gravity. An additional force acting on electric aircraft 800 may include, without limitation, lift, which may act to oppose the downward force of weight and may be produced by the dynamic effect of air acting on the airfoil and/or downward thrust from the propulsor 808 of the electric aircraft. Lift generated by the airfoil may depend on speed of airflow, density of air, total area of an airfoil and/or segment thereof, and/or an angle of attack between air and the airfoil. For example, and without limitation, electric aircraft 800 are designed to be as lightweight as possible. Reducing the weight of the aircraft and designing to reduce the number of components is essential to optimize the weight. To save energy, it may be useful to reduce weight of components of electric aircraft 800, including without limitation propulsors and/or propulsion assemblies. In an embodiment, motor 824 may eliminate need for many external structural features that otherwise might be needed to join one component to another component. Motor 824 may also increase energy efficiency by enabling a lower physical propulsor profile, reducing drag and/or wind resistance. This may also increase durability by lessening the extent to which drag and/or wind resistance add to forces acting on electric aircraft 800 and/or propulsors.

Figure 9:
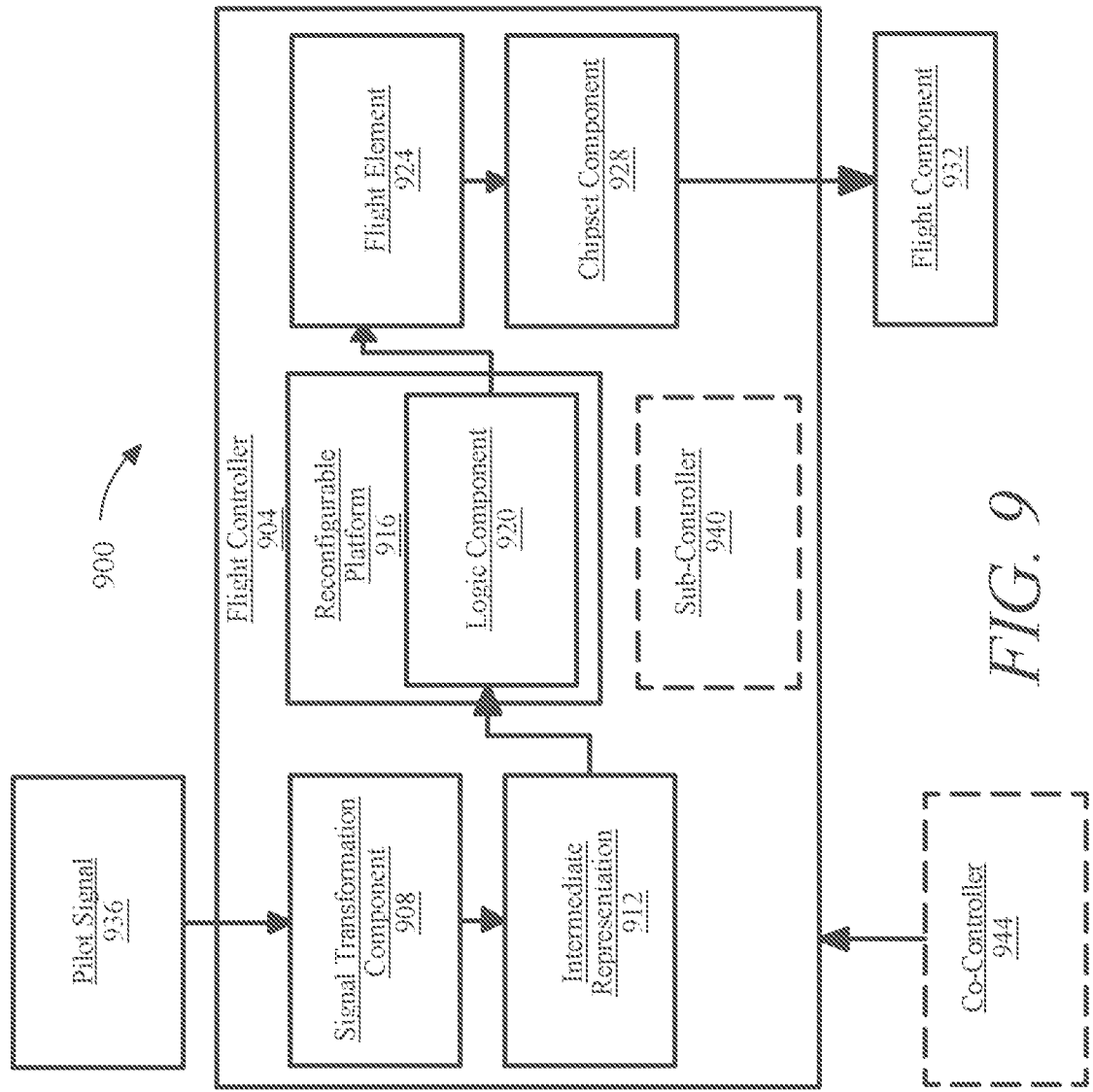
FIG. 9 is a block diagram depicting an exemplary flight controller.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

Still referring to FIG. 9, in an embodiment, and without limitation, signal transformation component 908 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

Still referring to FIG. 9, in an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 932. As used in this disclosure a "flight component" is a portion of an aircraft that can be moved or adjusted to affect one or more flight elements. For example, flight component 932 may include a component used to affect the aircrafts' roll and pitch which may comprise one or more ailerons. As a further example, flight component 932 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 932. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
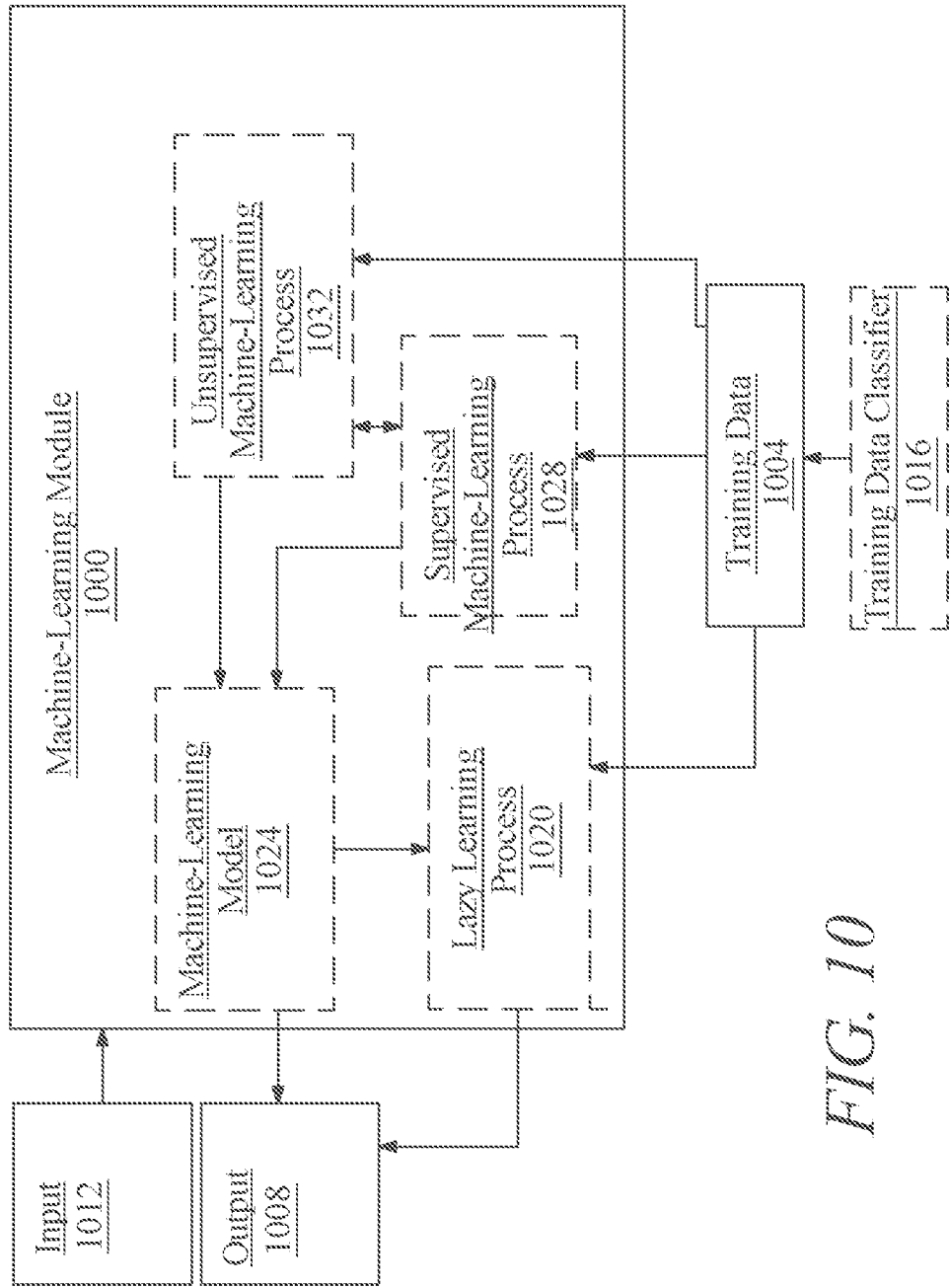
FIG. 10 is a block diagram of an exemplary machine-learning process.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 11:
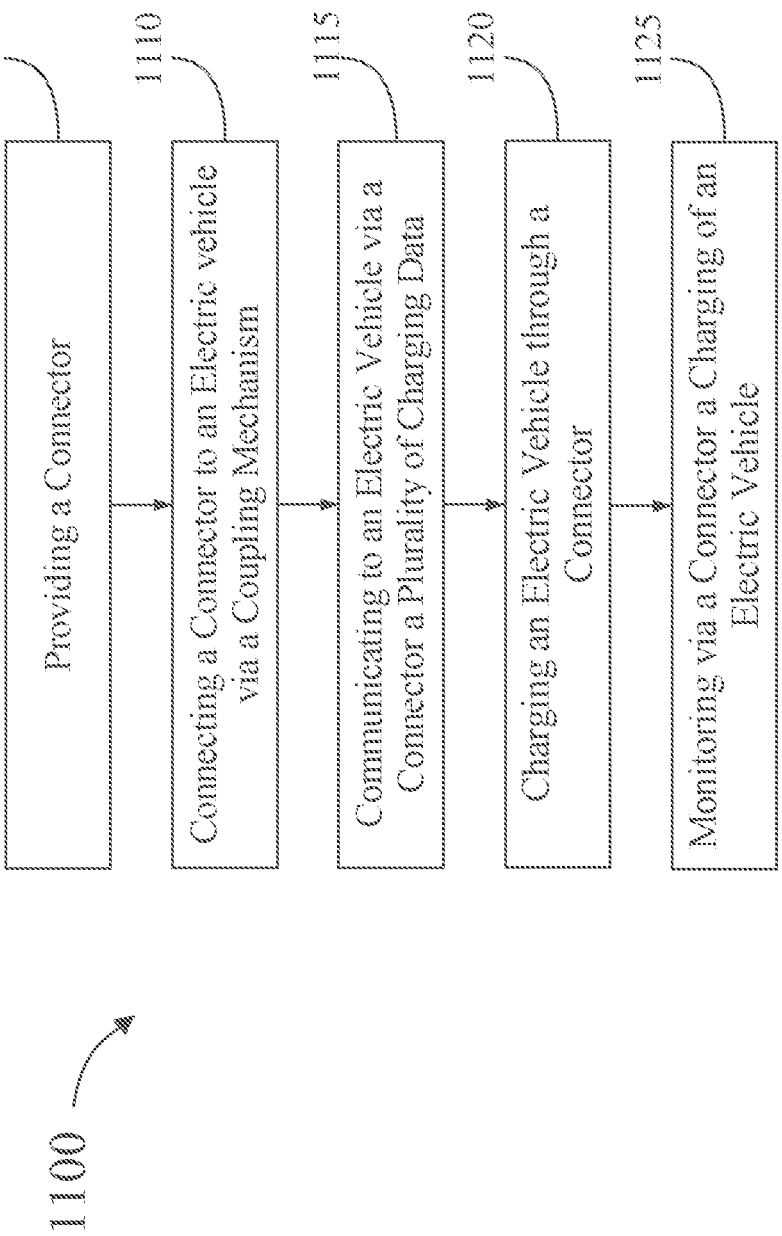
FIG. 11 is a flow diagram illustrating an exemplary method of use for a connector.

Referring now to FIG. 11, an exemplary method 1100 of charging, using a connector, an electric vehicle is illustrated. At step 1105, a connector is provided. A connector may include a coupling mechanism. A coupling mechanism may be configured to mate with an electric vehicle port of an electric vehicle. A coupling mechanism may include a fastener. A fastener may be configured to allow a removeable attachment of a coupling mechanism to an electric vehicle port. In some embodiments, a connector may include a direct current conductor. A direct current conductor may be configured to supply a direct current to an electric vehicle. In some embodiments, a connector may include a power supply circuit. A power supply circuit may be configured to regulate a direct current supplied to an electric vehicle. In some embodiments, a power supply circuit may be configured to regulate a direct current supplied to an electric vehicle as a function of a power threshold. Charging an electric vehicle using a connector may be as described in FIG. 1.

Still referring to FIG. 11, at step 1110, a connector is connected to an electric vehicle via a coupling mechanism. In some embodiments, a coupling mechanism may include a male connector. In some embodiments, a coupling mechanism may include a female connector. In some embodiments, a coupling mechanism may include magnets. In some embodiments, a coupling mechanism may be configured to provide an electrical communication between a connector and an electric vehicle. In some embodiments, a connector may connect to a side surface of an electric vehicle. In some embodiments, a connector may connect to a top surface of an electric vehicle. In some embodiments, a connector may connect to a rear surface of an electric vehicle. In some embodiments, a connector may connect to a bottom surface of an electric vehicle. A coupling mechanism may be as described in FIG. 1.

Still referring to FIG. 11, at step 1115, a plurality of charging data is communicated to an electric vehicle via a connector. A plurality of charging data may be communicated to an electric vehicle through a wired connection of a connector. In some embodiments, a plurality of charging data may be communicated to an electric vehicle wirelessly. In some embodiments, an electric vehicle may initiate a communication to a connector. In some embodiments, a plurality of charging data may include, but is not limited to, voltage levels, current levels, power levels, power level thresholds, and/or charging times. A plurality of charging data may be as described in FIG. 1.

Still referring to FIG. 11, at step 1120, an electric vehicle is charged through a connector. A charging of an electric vehicle may include a connector providing a current to an electric vehicle. A charging of an electric vehicle may include a connector providing a voltage to an electric vehicle. A charging of an electric vehicle may include delivering power to a battery of an electric vehicle. An electric vehicle may be charged as described in FIG. 1.

Still referring to FIG. 11, at step 1125, a charging of an electric vehicle is monitored via a connector. A connector may monitor a charging of an electric vehicle through a power supply circuit. In some embodiments, a connector may monitor a charging of an electric vehicle through a sensor suite. Monitoring may include, but is not limited to, sensing a voltage, current, power output, power input, temperature and/or resistance. In some embodiments, a feedback signal of a power supply circuit of a connector may be generated. A feedback signal may include data about a charging of an electric vehicle. A connector may use a feedback signal to actively update a voltage, current, and/or power deliver to an electric vehicle as a function of a feedback signal. Charging of an electric vehicle may be as described in FIG. 1.

Exemplary embodiments may be further understood without limitation, with reference to the table below.

|  | Min. | Max. | Nom. |
| --- | --- | --- | --- |
| Electrical charging current power (AC) | 1 KW | 200 KW | 20 KW |
| Electrical charging current (AC) | 10 Amps | 450 Amps | 80 Amps |
| Electrical charging current power (DC) | 1 KW | 250 KW | 25 KW |
| Electrical charging current (DC) | 10 Amps | 500 Amps | 50 Amps |
| Battery acceptable temperature change during charging | −30° C. | +50° C. | 0° C. |
| Conductor acceptable temperature change during charging | −30° C. | +50° C. | 0° C. |
| Connector-Port mating sequence | Mated First: proximity contact, isolation monitor contacts. Mated Last: AC conductor, DC conductor, control signal. | | |
| Conductor materials | Copper, copper-alloys, noble metals, non-noble metals, carbon, diamond, graphite, platinum group metals, and the like. | | |
| Conductor coatings | Copper, copper-alloys, noble metals, non-noble metals, carbon, diamond, graphite, hard gold, hard gold flashed palladium-nickel (e.g., 80/20), tin, silver, diamond-like carbon, platinum-group metals, and the like. | | |

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
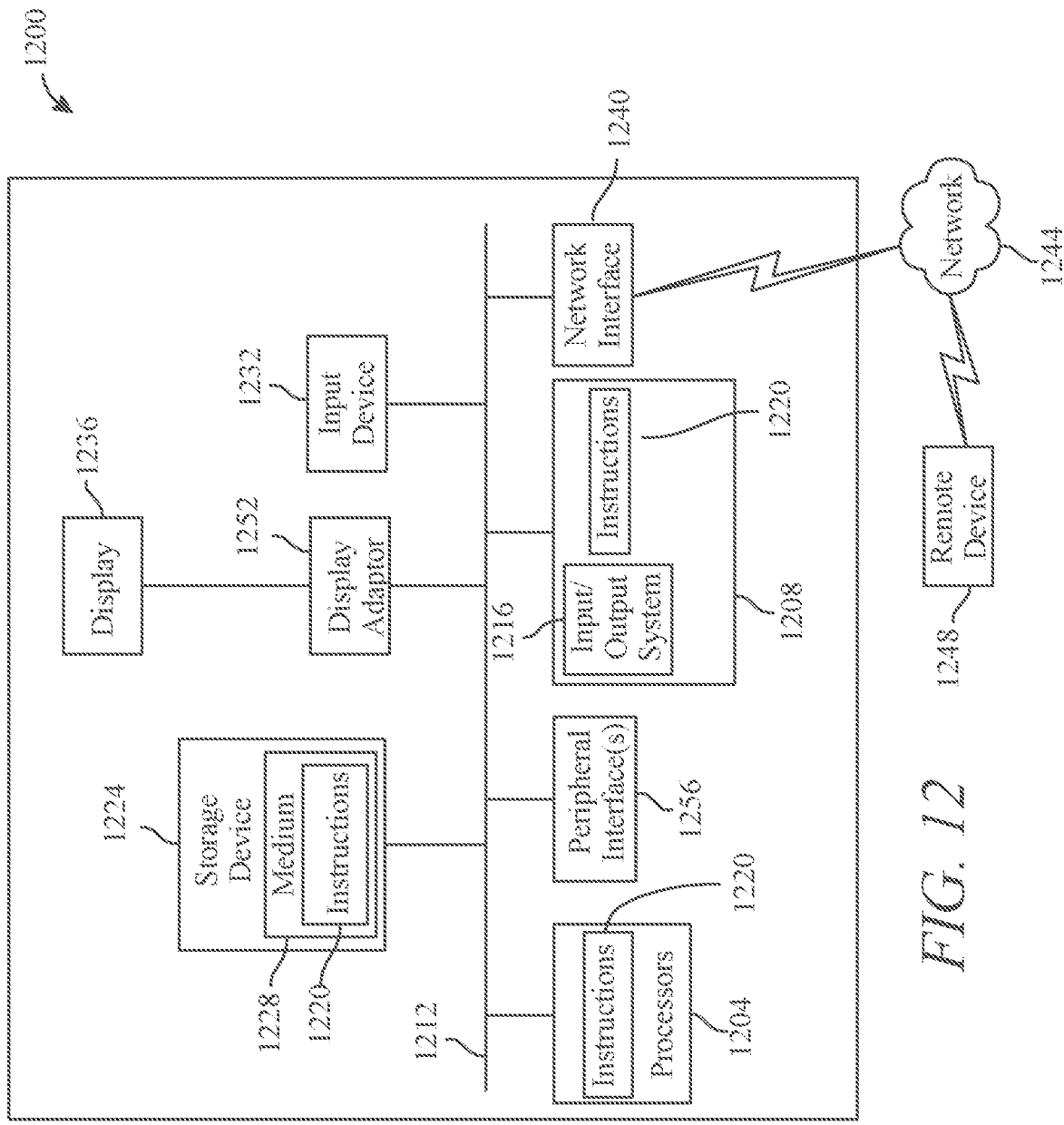
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Still referring to FIG. 12, processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Still referring to FIG. 12, memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Still referring to FIG. 12, computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Still referring to FIG. 12, computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

Still referring to FIG. 12, a user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto.

Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Still referring to FIG. 12, computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A connector for charging an electric vehicle, comprising:
   a coupling mechanism, wherein the coupling mechanism is configured to mate with an electric vehicle port and a test port of the electric vehicle, wherein the coupling mechanism comprises a fastener for removable attachment with the electric vehicle port and the test port;
   a proximity signal conductor, wherein the proximity signal conductor is configured to conduct a proximity signal indicative of attachment between the connector and the electric vehicle port;
   at least a direct current conductor, wherein the at least a direct current conductor is configured to supply a direct current to the electric vehicle;
   a power supply circuit, wherein the power supply circuit is configured to regulate the direct current supplied to at least a battery of the electric vehicle as a function of a power threshold, wherein the power supply circuit includes a power source including at least a charging battery;
   a communication controller coupled to the power supply circuit, wherein the communication controller is configured to terminate the direct current supply to the electric vehicle as a function of a failed charge event, wherein the failed charge event is based on a battery sensor signal received by the communication controller from the electric vehicle indicating detection of a cell failure gas emission from at least a battery cell of the electric vehicle, wherein when the coupling mechanism is coupled to the test port, the communication controller is configured to receive feedback signals from the test port to test functionality of the at least a direct current conductor and the proximity signal conductor; and
   an isolation monitor conductor, wherein the isolation monitor conductor is configured to detect whether the power supply circuit is electrically isolated from the communication controller.

2. The connector of claim 1, wherein the electric vehicle includes an electric aircraft.

3. The connector of claim 1, wherein the coupling mechanism includes a locking function.

4. The connector of claim 1, wherein the connector further comprises at least an alternating current conductor, wherein the at least an alternating current conductor is configured to conduct an alternating current.

5. The connector of claim 1, wherein the connector further comprises at least a ground conductor, wherein the at least a ground conductor is configured to conduct a ground.

6. The connector of claim 1, wherein the connector is configured to charge the electric vehicle as a function of the communication controller.

7. The connector of claim 1, wherein a failed charge event includes a power overload of the power supply circuit.

8. The connector of claim 1, wherein the communication controller is further configured to terminate communication with the electric vehicle as a function of a failed charge event.

9. The connector of claim 1, wherein the power supply circuit is configured to receive the power threshold from the electric vehicle.

10. The system of claim 1, wherein the battery sensor signal further indicates detection of a swell of a battery cell of the at least a battery cell of the electric vehicle.

11. The system of claim 1, wherein the power source includes a solar inverter, and wherein energy generated by the solar inverter is stored in the at least a charging battery of the power source.

12. A method of charging an electric vehicle, comprising:
   mating a coupling mechanism of a connector with a test port of the electric vehicle;
   mating a coupling mechanism of a connector with an electric vehicle port of the electric vehicle, wherein the coupling mechanism comprises a fastener for removable attachment with the electric vehicle port;

conducting, by a proximity signal conductor, a proximity signal indicative of attachment between the connector and the electric vehicle port;

supplying, by at least a direct current conductor of the connector, a direct current to the electric vehicle;

regulating, by a power supply circuit of the connector, the direct current supplied to at least a battery of the electric vehicle as a function of a power threshold, wherein the power supply circuit includes a power source including at least a charging battery;

terminating, by a communication controller of the connector coupled to the power supply circuit, the direct current supply to the electric vehicle as a function of a failed charge event, wherein the failed charge event is based on a battery sensor signal received by the communication controller from the electric vehicle indicating detection of a cell failure gas emission from at least a battery cell of the electric vehicle; and receiving, by the communication controller, feedback signals from the test port to test functionality of the at least a direct current conductor and the proximity signal conductor when the coupling mechanism is mated to the test port, detecting, by an isolation monitor conductor, an electrical isolation between the power supply circuit and the communication controller.

13. The method of claim 12, wherein the electric vehicle includes an electric aircraft.

14. The method of claim 12, wherein the coupling mechanism includes a locking function.

15. The method of claim 12, wherein the connector further comprises at least an alternating current conductor, wherein the at least an alternating current conductor is configured to conduct an alternating current.

16. The method of claim 12, wherein the connector further comprises at least a ground conductor, wherein the at least a ground conductor is configured to conduct a ground.

17. The method of claim 12, wherein the connector is configured to charge the electric vehicle as a function of the communication controller.

18. The method of claim 12, wherein a failed charge event includes a power overload of the power supply circuit.

19. The method of claim 12, wherein the communication controller is further configured to terminate communication with the electric vehicle as a function of a failed charge event.

20. The method of claim 12, wherein the power supply circuit is configured to receive the power threshold from the electric vehicle.

* * * * *